(12) United States Patent
Tong et al.

(10) Patent No.: US 11,386,698 B2
(45) Date of Patent: Jul. 12, 2022

(54) METHOD AND DEVICE FOR SENDING ALARM MESSAGE

(71) Applicant: HANGZHOU HIKVISION DIGITAL TECHNOLOGY CO., LTD., Hangzhou (CN)

(72) Inventors: Haohao Tong, Hangzhou (CN); Junyan Tong, Hangzhou (CN); Ye Ren, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 119 days.

(21) Appl. No.: 16/480,126

(22) PCT Filed: Jan. 23, 2018

(86) PCT No.: PCT/CN2018/073775
§ 371 (c)(1),
(2) Date: May 8, 2020

(87) PCT Pub. No.: WO2018/133874
PCT Pub. Date: Jul. 26, 2018

(65) Prior Publication Data
US 2021/0319211 A1    Oct. 14, 2021

(30) Foreign Application Priority Data

Jan. 23, 2017 (CN) .......................... 201710050732.5

(51) Int. Cl.
*G06V 40/16*    (2022.01)
*G06K 9/62*    (2022.01)
(Continued)

(52) U.S. Cl.
CPC ......... *G06V 40/161* (2022.01); *G06K 9/6256* (2013.01); *G06V 40/20* (2022.01); *G08B 21/18* (2013.01); *G08B 21/0297* (2013.01)

(58) Field of Classification Search
CPC ........... G06K 9/00228; G06K 9/00335; G06K 9/6256; G08B 21/18
See application file for complete search history.

(56) References Cited

U.S. PATENT DOCUMENTS

2015/0286884 A1* 10/2015 Xu ..................... G06K 9/00845
382/103
2018/0238686 A1*  8/2018 Blacutt ................ G01C 11/025

FOREIGN PATENT DOCUMENTS

CN    103366506    10/2013
CN    104217223 A   12/2014
(Continued)

OTHER PUBLICATIONS

First office action of Chinese application No. 201710050732.5 dated Nov. 29, 2019.
(Continued)

*Primary Examiner* — Ruiping Li
(74) *Attorney, Agent, or Firm* — Knobbe, Martens, Olson & Bear, LLP

(57) ABSTRACT

A method for sending an alarm message, and belongs to the field of computer technology. The method includes: acquiring a detection image (201) captured by an image capturing apparatus; determining a target detection area (202); and detecting a person's call status information corresponding to an image in the target detection area according to a preset on-the-phone determination algorithm model, and sending a first alarm message (203) to a server if the person's call status information shows that the person is on the phone.

16 Claims, 14 Drawing Sheets

(51) Int. Cl.
  *G08B 21/18* (2006.01)
  *G06V 40/20* (2022.01)
  *G08B 21/02* (2006.01)

(56) References Cited

FOREIGN PATENT DOCUMENTS

| CN | 104573659 | | 4/2015 |
|---|---|---|---|
| CN | 104966059 | | 10/2015 |
| CN | 105046725 | A | 11/2015 |
| CN | 105913022 | | 8/2016 |
| CN | 105989328 | A | 10/2016 |
| CN | 105989329 | A | 10/2016 |
| CN | 105989348 | A | 10/2016 |

OTHER PUBLICATIONS

International Search Report issued in Application No. PCT/CN2018/073775 dated Apr. 19, 2018.
Extended European search report of counterpart EP application No. 18741996.5 dated Feb. 3, 2020.

* cited by examiner

METHOD AND DEVICE FOR SENDING ALARM MESSAGE

CROSS-REFERENCE TO RELATED APPLICATION

The present disclosure is a national phase application of PCT patent application No.: PCT/CN2018/073775, filed on Jan. 23, 2018 and entitled "Method and Device for Sending Alarm Message", which claims priority to Chinese Patent Application No. 201710050732.5, filed on Jan. 23, 2017 and entitled "Method and Device for Sending Alarm Message", both of which are incorporated herein by reference in their entirety.

TECHNICAL FIELD

The present disclosure relates to the field of computer technology, and in particular, to a method and device for sending an alarm message.

BACKGROUND

With the rapid development of the finance and communications industries, telecom fraud is increasingly rampant and happens more and more frequently. The telecom fraud mainly refers to that a fraudster makes a call to a user of a mobile terminal to lure the user to an ATM (Automatic Teller Machine) for a financial transaction, and controls the user's operation via mobile phone, so as to make profits.

In order to avoid the loss caused by the telecom fraud, at present, a bank will arrange several security guards around the ATM to observe users who make the transactions on the ATM. If a security guard judges that the user is possibly controlled by the fraudster, he/she will alert the user and interfere with the transaction when necessary. In this way, the user can be prevented from being swindled to some extent, so that the property loss of the user can be avoided.

However, in a process of implementing the present disclosure, the inventors found that the related art at least has the following problem:

The security guard cannot notice every swindled user when there are many people in the bank as the observation ability of the security guard is limited, resulting in the property loss of the user.

SUMMARY

The embodiments of the present disclosure provide a method for sending an alarm message, capable of solving the problem of property loss of users in the related art. Technical solutions of the method are as follows.

In an aspect, a method for sending an alarm message is provided. The method includes:

acquiring a detection image captured by an image capturing apparatus;

determining a target detection area in the detection image; and detecting a person's call status information corresponding to an image in the target detection area according to a preset on-the-phone determination algorithm model, and sending a first alarm message to a server if the person's call status information shows that the person is on the phone.

Optionally, determining the target detection area in the detection image includes:

detecting a face image area and a head and shoulder image area in the detection image based on a preset face and head and shoulder detection algorithm model; and determining the target detection area in the detection image according to the detection results of both the face image area and the head and shoulder image area.

Optionally, determining the target detection area in the detection image according to the detection results of both the face image area and the head and shoulder image area includes:

if the face image area and the head and shoulder image area are detected, determining the target detection area in the detection image according to a pre-stored positional relationship among the face image area, the head and shoulder image area, and a detection area; or if the face image area is detected but the head and shoulder image area is not detected, enlarging the detected face image area, and using the enlarged face image area as the target detection area; or if the head and shoulder image area is detected but the face image area is not detected, reducing the detected head and shoulder image area, and using the reduced head and shoulder image area as the target detection area.

In this way, implementations for determining the target detection area in different situations are provided, so that a detection rate of the target detection area increases.

Optionally, the method further includes:

acquiring a plurality of pre-stored training samples including an image sample, and a face image area and/or a head and shoulder image area in the image sample; and training a preset first initial algorithm model based on the plurality of training samples to obtain the face and head and shoulder detection algorithm model.

In this way, an implementation for training the face and head and shoulder detection algorithm model is provided.

Optionally, the method further includes:

acquiring a plurality of pre-stored training samples including an image sample, and a person's call status information of corresponding to the image sample; and training a preset second initial algorithm model based on the plurality of training samples to obtain the on-the-phone determination algorithm model.

In this way, an implementation for training the on-the-phone determination algorithm model is provided.

Optionally, detecting a face image area and a head and shoulder image area in the detection image based on a preset face and head and shoulder detection algorithm model, including:

determining a tentative face image area and a tentative head and shoulder image area in the detection image based on the preset face and head and shoulder detection algorithm model, determining a confidence level corresponding to the tentative face image area as well as a confidence level corresponding to the tentative head and shoulder image area;

determining a weight value corresponding to the tentative face image area and a weight value corresponding to the tentative head and shoulder image area according to a pre-stored corresponding relationship between position information and weight;

if the confidence level corresponding to the tentative face image area is greater than a preset first confidence level threshold, and the weight value corresponding to the tentative face image area is greater than a preset first weight value threshold, the tentative face image area is used as the face image area; and if the confidence level of the tentative head and shoulder image area is greater than a preset second confidence level threshold, and the weight value corresponding to the to-be-determined head and shoulder image area is greater than a preset second weight value threshold, the tentative head and shoulder image area is used as the head and shoulder image area.

In this way, by combining the position information to determine the face image area and the head and shoulder image area, the accuracy of determining the face image area and the head and shoulder image area can be improved.

Optionally, the method further includes:

determining a similarity between a currently detected face image area and/or head and shoulder image area and a face image area and/or head and shoulder image area in a previous frame of detection image closest to the current time.

Prior to sending the first alarm message to the server, the method further includes:

if the similarity does not satisfy a preset similarity condition, the step of sending the first alarm message to the server is performed.

In this way, repeatedly sending the alarm message to the same object can be avoided.

Optionally, the method further includes:

acquiring voice information detected by a voice input apparatus; and if the voice information includes a preset keyword, a second alarm message is sent to the server.

In this way, the alarm message can be sent according to the voice information, so that multi stage alarm can be realized, and the security guard can take different measures according to different alarm messages, such as paying attention or going to the scene to check out, thereby improving the user experience.

Optionally, prior to detecting the face image area and the head and shoulder image area in the detection image based on the preset face and head and shoulder detection algorithm model, the method further includes:

if a preset detection trigger condition is fulfilled, the step of detecting the face image area and the head and shoulder image area in the detection image is performed based on the preset face and head and shoulder detection algorithm model, wherein the preset detection trigger condition at least includes:

determining that person's activity information is detected in the detection image;

or determining that an operation notification message sent by a target apparatus is received; or determining that an object detection notification sent by a sensing apparatus is received.

Optionally, the method further includes:

determining a similarity between a currently detected face image area and/or head and shoulder image area and a face image area and/or head and shoulder image area in each frame of detection image acquired within a preset period; and prior to sending the first alarm message to the server, the method further includes:

if none of the obtained similarities satisfies a preset similarity condition, the step of sending the first alarm message to the server is performed.

In another aspect, a device for sending an alarm message is provided, which includes:

a first acquiring module, configured to acquire a detection image captured by an image capturing apparatus;

a first determining module, configured to determine a target detection area in the detection image; and a first sending module, configured to detect the call status information of a person corresponding to an image in the target detection area according to a preset on-the-phone determination algorithm model, and send a first alarm message to a server if the call status information of the person shows that the person is on the phone.

Optionally, the device further includes:

a detecting module, configured to detect a face image area and a head and shoulder image area in the detection image based on a preset face and head and shoulder detection algorithm model, wherein the first determining module is configured to determine the target detection area in the detection image according to detection results of both the face image area and the head and shoulder image area.

Optionally, the first determining module is configured to:

if the face image area and the head and shoulder image area are detected, determine the target detection area in the detection image according to a pre-stored positional relationship among the face image area, the head and shoulder image area, and a detection area; or if the face image area is detected but the head and shoulder image area is not detected, enlarge the detected face image area, and use the enlarged face image area as the target detection area; or if the head and shoulder image area is detected but the face image area is not detected, the detected head and shoulder image area is reduced, and the reduced head and shoulder image area is used as the target detection area.

Optionally, the device further includes:

a second acquiring module, configured to acquire a plurality of pre-stored training samples including an image sample, and a face image area and/or a head and shoulder image area in the image sample; and a first training module, configured to train a preset first initial algorithm model based on the plurality of training samples to obtain the face and head and shoulder detection algorithm model.

Optionally, the device further includes:

a third acquiring module, configured to acquire a plurality of pre-stored training samples including an image sample, and a person's call status information corresponding to the image sample; and a second training module, configured to train a preset second initial algorithm model based on the plurality of training samples to obtain the on-the-phone determination algorithm model.

Optionally, the detecting module includes:

a first determining sub-module, configured to determine a to-be-determined face image area and a to-be-determined head and shoulder image area in the detection image based on the preset face and head and shoulder detection algorithm model, and determine a confidence level corresponding to the tentative face image area as well as a confidence level corresponding to the tentative head and shoulder image area; and a second determining sub-module, configured to determine a weight value corresponding to the tentative face image area and a weight value corresponding to the tentative head and shoulder image area according to a pre-stored corresponding relationship between the position information and the weight, wherein the second determining sub-module is further configured to: if the confidence level corresponding to the tentative face image area is greater than a preset first confidence level threshold, and the weight value corresponding to the tentative face image area is greater than a preset first weight value threshold, the tentative face image area is used as the face image area; and if the confidence level of the tentative head and shoulder image area is greater than a preset second confidence level threshold, and the weight value corresponding to the tentative head and shoulder image area is greater than a preset second weight value threshold, the tentative head and shoulder image area is used as the head and shoulder image area.

Optionally, the device further includes:

a second determining module, configured to determine a similarity between a currently detected face image area and/or head and shoulder image area and face image area and/or head and shoulder image area in a previous frame of detection image closest to the current time, wherein the first sending module is configured to:

if the similarity does not satisfy a preset similarity condition, the step of sending the first alarm message to the server is performed.

Optionally, the device further includes:

a fourth acquiring module, configured to acquire voice information detected by a voice input apparatus; and a second sending module, configured to: if the voice information includes a preset keyword, send a second alarm message to the server.

Optionally, the device further includes:

a third determining module, configured to: if a preset detection trigger condition is fulfilled, the step of detecting the face image area and the head and shoulder image area in the detection image based on the preset face and head and shoulder detection algorithm model is performed, wherein the preset detection trigger condition at least includes:

that person's activity information is detected in the detection image; or that an operation notification message sent by a target apparatus is received; or that an object detection notification sent by a sensing apparatus is received.

Optionally, the first determining module is further configured to:

determine a similarity between a currently detected face image area and/or head and shoulder image area and a face image area and/or head and shoulder image area in each frame of detection image acquired within a preset period; and the first sending module is further configured to:

if none of the obtained similarities satisfies a preset similarity condition, the step of sending the first alarm message to the server is performed.

In yet another aspect, a computer-readable storage medium is provided, wherein a computer program is stored in the storage medium; and the steps of the method in the above aspect are implemented when the computer program is executed by a processor.

In still yet another aspect, a terminal is provided, including:

one or more processors; and a memory, wherein the memory stores one or more programs configured to be executed by the one or more processors, and the one or more programs include the instructions for performing the following steps:

acquiring a detection image captured by an image capturing apparatus;

determining a target detection area in the detection image; and detecting a person's call status information corresponding to an image in the target detection area according to a preset on-the-phone determination algorithm model, and sending a first alarm message to a server if the person's call status information shows that the person is on the phone.

Optionally, the one or more programs comprise instructions for performing the following steps:

detecting a face image area and a head and shoulder image area in the detection image based on a preset face and head and shoulder detection algorithm model; and determining the target detection area in the detection image according to detection results of both the face image area and the head and shoulder image area.

Optionally, the one or more programs comprise instructions for performing the following steps:

if the face image area and the head and shoulder image area are detected, determining the target detection area in the detection image according to a pre-stored positional relationship among the face image area, the head and shoulder image area, and a detection area; or if the face image area is detected but the head and shoulder image area is not detected, enlarging the detected face image area, and using the enlarged face image area as the target detection area; or if the head and shoulder image area is detected but the face image area is not detected, reducing the detected head and shoulder image area, and using the reduced head and shoulder image area as the target detection area.

Optionally, the one or more programs comprise instructions for performing the following steps:

acquiring a plurality of pre-stored training samples comprising an image sample, and acquiring a face image area and/or a head and shoulder image area in the image sample; and training a preset first initial algorithm model based on the plurality of training samples to obtain the face and head and shoulder detection algorithm model.

Optionally, the one or more programs comprise instructions for performing the following steps:

determining a tentative face image area and a tentative head and shoulder image area in the detection image based on the preset face and head and shoulder detection algorithm model, determining a confidence level corresponding to the tentative face image area as well as a confidence level corresponding to the tentative head and shoulder image area;

determining a weight value corresponding to the tentative face image area and a weight value corresponding to the tentative head and shoulder image area according to a pre-stored correspondence relationship between position information and weight;

if the confidence level corresponding to the tentative face image area is greater than a preset first confidence level threshold, and the weight value corresponding to the tentative face image area is greater than a preset first weight value threshold, determining the tentative face image area as the face image area; and if the confidence level of the tentative head and shoulder image area is greater than a preset second confidence level threshold, and the weight value corresponding to the tentative head and shoulder image area is greater than a preset second weight value threshold, determining the tentative head and shoulder image area as the head and shoulder image area.

Optionally, the one or more programs comprise instructions for performing the following step: determining a similarity between a currently detected face image area and/or head and shoulder image area and a face image area and/or head and shoulder image area in a previous frame of detection image closest to the current time; and the one or more programs comprise instructions for performing the following step: performing the step of sending the first alarm message to the server if the similarity does not satisfy a preset similarity condition.

Optionally, the one or more programs comprise instructions for performing the following step:

if a preset detection trigger condition is fulfilled, performing the step of detecting the face image area and the head and shoulder image area in the detection image based on the preset face and head and shoulder detection algorithm model, wherein the preset detection trigger condition at least comprises:
determining that person's activity information is detected in the detection image;
or
determining that an operation notification message sent by a target apparatus is received; or
determining that an object detection notification sent by a sensing apparatus is received.

Optionally, the one or more programs comprise instructions for performing the following step: determining a similarity between a currently detected face image area and/or head and shoulder image area and a face image area and/or head and shoulder image area in each frame of detection image acquired within a preset period; and the one or more programs further comprise instructions for performing the following step: performing the step of sending the first alarm message to the server if none of the obtained similarities satisfies a preset similarity condition.

Optionally, the one or more programs comprise instructions for performing the following steps:

acquiring a plurality of pre-stored training samples comprising an image sample, and a person's call status information corresponding to the image sample; and training a preset second initial algorithm model based on the plurality of training samples to obtain the on-the-phone determination algorithm model.

Optionally, the one or more programs comprise instructions for performing the following step:

acquiring voice information detected by a voice input apparatus; and if the voice information includes a preset keyword, sending a second alarm message to the server.

The technical solutions provided by the embodiments of the present disclosure bring the following beneficial effects.

In the embodiment of the present disclosure, after the terminal acquires the detection image captured by the image capturing apparatus, the target detection area can be determined in the detection image; the person's call status information corresponding to the image in the target detection area is detected according to the preset on-the-phone determination algorithm model; and the first alarm message is sent to the server if the person's call status information shows that the person is on the phone. In this way, whether a user is on the phone can be recognized in time; and the alarm message can be sent in time when it is detected that the user is on the phone. Thus, the security guard can be informed in time that there may be a swindled user, and take the measures to prevent the user from property loss.

BRIEF DESCRIPTION OF THE DRAWINGS

In order to explain the technical solutions of the embodiments provided by the present disclosure more clearly, a brief introduction may be given hereinafter to the drawings that may be used in the description of the embodiments. Apparently, the drawings in the description below are merely some embodiments of the present disclosure, and other drawings may be obtained by those skilled in the art according to these drawings without paying any creative labor.

DETAILED DESCRIPTION

To make the objectives, technical solutions, and advantages of the present disclosure clearer, the followings will describe the embodiments of the present disclosure in detail with reference to the drawings.

Figure 1:
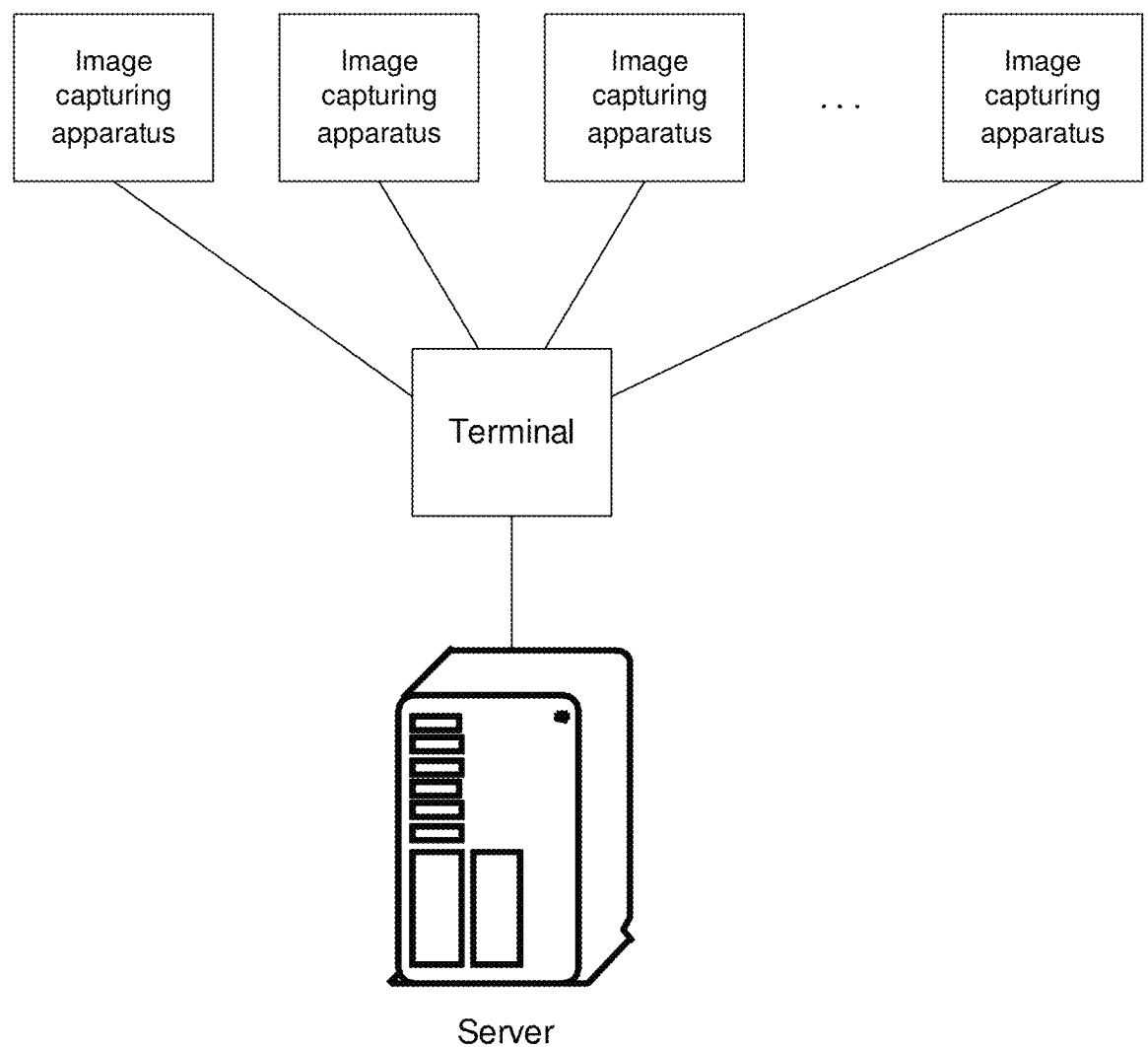
FIG. 1 is a system frame diagram provided by an embodiment of the present disclosure.

The embodiments of the present disclosure provide a method for sending an alarm message. A main executive body of the method may be a terminal or a server. In this embodiment, a terminal is taken as an example of the main executive body for description, and other cases are similar. The terminal may be a terminal with a data processing function, such as a computer. The terminal may be connected to an image capturing apparatus and a background server of an alarm platform. Wherein, the image capturing apparatus may be mounted on or around an apparatus (such as ATM) for handling capital business. The image capturing apparatus can capture an image, and can also send the captured image (i.e., a detection image) to the terminal in real time. After receiving the detection image, the terminal can analyze the detection image to determine whether a person in the detection image is on the phone. If yes, an alarm message can be sent to the server of the alarm platform. After receiving the alarm message, the server sends an alarm prompt message to a terminal (such as a monitoring terminal) of a security guard to prompt the security guard to take a measure to prevent the user from property loss. FIG. 1 is a system frame diagram provided by an embodiment of the present disclosure, and includes an image capturing apparatus, a terminal, and a server.

The terminal may include a transceiver, a processor, and a memory. The transceiver may be configured to receive the detection image captured by the image capturing apparatus. The processor may be a CPU (Central Processing Unit), or the like, and may detect a face image area and a head and shoulder image area in the detection image based on a preset face and head and shoulder detection algorithm model. Then, a target detection area is determined in the detection image according to detection results of both the face image area and the head and shoulder image area. Further, a person's call status information corresponding to an image in the target detection area is detected according to a preset on-the-phone determination algorithm model, and the transceiver may be controlled to send a first alarm message to the server if the person's call status information shows that the person is on the phone. The memory may be an RAM (Random Access Memory), a Flash (Flash), and the like, and can store received data, required data during the processing, data generated during the processing, and the like, such as the detection image, the face and head and shoulder detection algorithm model, the on-the-phone determination algorithm model, and the like. In addition, the terminal may further include components such as Bluetooth and a power supply.

Figure 2:
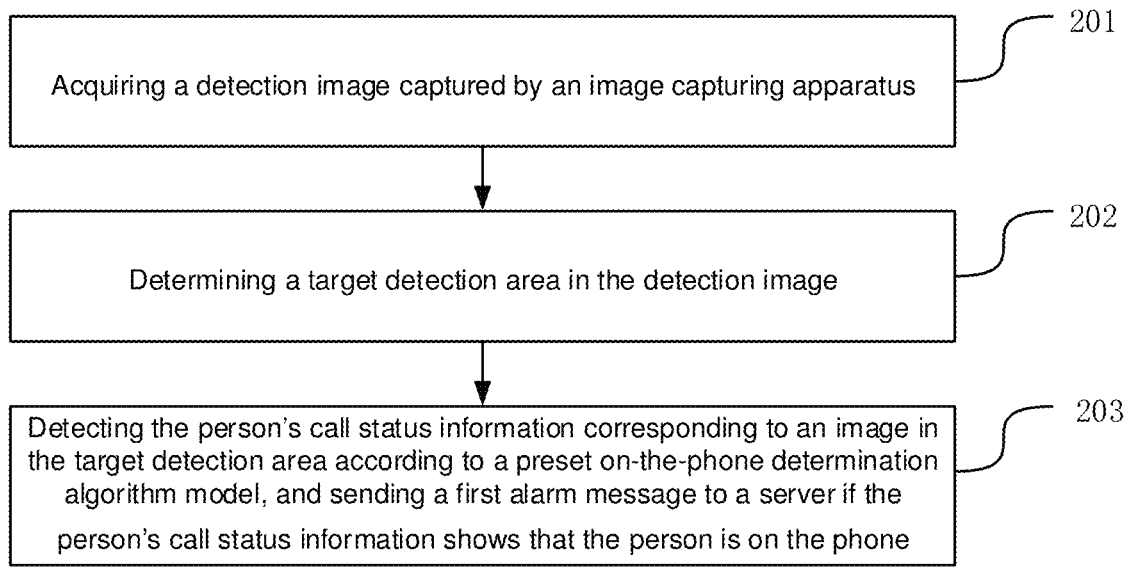
FIG. 2 is a flow chart of a method for sending an alarm message according to an embodiment of the present disclosure.

A processing flow chart shown in FIG. 2 will be described in detail by taking an apparatus for capital business (for example, an ATM) as an example in conjunction with the specific implementation below, and the details are as follows.

In step 201, a detection image captured by an image capturing apparatus is acquired.

In the implementation, the image capturing apparatus around the ATM can capture an image when in an on state, and can send the captured image (i.e., the detection image) to a terminal in real time. The terminal can receive the detection image sent by the image capturing apparatus, and can store the detection image. In addition, the image capturing apparatus may further send its corresponding identifier of the ATM to the terminal; and the terminal may correspondingly store the detection image and the identifier of the ATM.

In step 202, a target detection area is determined in the detection image.

In the implementation, after acquiring the detection image captured by the image capturing apparatus, the terminal can determine the target detection area for determining a person's call status information in the acquired detection image.

In step 203, the person's call status information corresponding to an image in the target detection area is detected according to a preset on-the-phone determination algorithm model, and a first alarm message is sent to a server if the person's call status information shows that the person is on the phone.

In the implementation, the terminal may store the preset on-the-phone determination algorithm model which can be obtained through training. After determining the target detection area, the terminal may detect the person's call status information corresponding to the image in the target detection area according to the preset on-the-phone determination algorithm model. Wherein, the person's call status information may show that the person is on the phone or is not on the phone.

Optionally, the terminal may count the number of frames of the detection images when the person's call status information shows that the person is on the phone within the preset period. If the number of the frames is greater than a preset threshold, a first alarm message may be sent to the server. That is, if the person's call status information shows that the person is on the phone, and the number of the frames of the detection images when the person's call status information shows that the person is on the phone within the preset period is greater than the preset threshold, the first alarm message may be sent to the server. Alternatively, the terminal may count the number of frames of the detection images when the person's call status information of the person shows that the is on the phone within the preset period, and if a ratio of the number of the frames to the number of the total frames of the detection images acquired within the preset period is greater than a preset ratio threshold, the first alarm message may be sent to the server. That is, if the person's call status information shows that the person is on the phone, and the ratio of the number of frames of the detection images when the person's call status information shows that the person is on the phone within the preset period, to the total frames of the detection images acquired within the preset period is greater than the preset ratio threshold, the first alarm message may be sent to the server.

The first alarm message may carry an identifier of an ATM. After receiving the first alarm message, the server may send the first alarm notification message carrying the identifier of the ATM to the terminal of the security guard, so as to alert the security guard of paying attention to the use who is using a target apparatus, wherein the target apparatus is an apparatus that corresponds to the identifier of the ATM.

In the embodiment of the present disclosure, after the terminal acquires the detection image captured by the image capturing apparatus, the target detection area can be determined in the detection image; the person's call status information corresponding to the image in the target detection area is detected according to the preset on-the-phone determination algorithm model; and the first alarm message is sent to the server if the person's call status information shows that the person is on the phone. In this way, whether a user is on the phone can be recognized in time; and the alarm message can be sent in time when the user is detected being on the phone. Thus, the security guard can be informed in time that there may be a swindled user, and to take measures to prevent the user from property loss.

Figure 3:
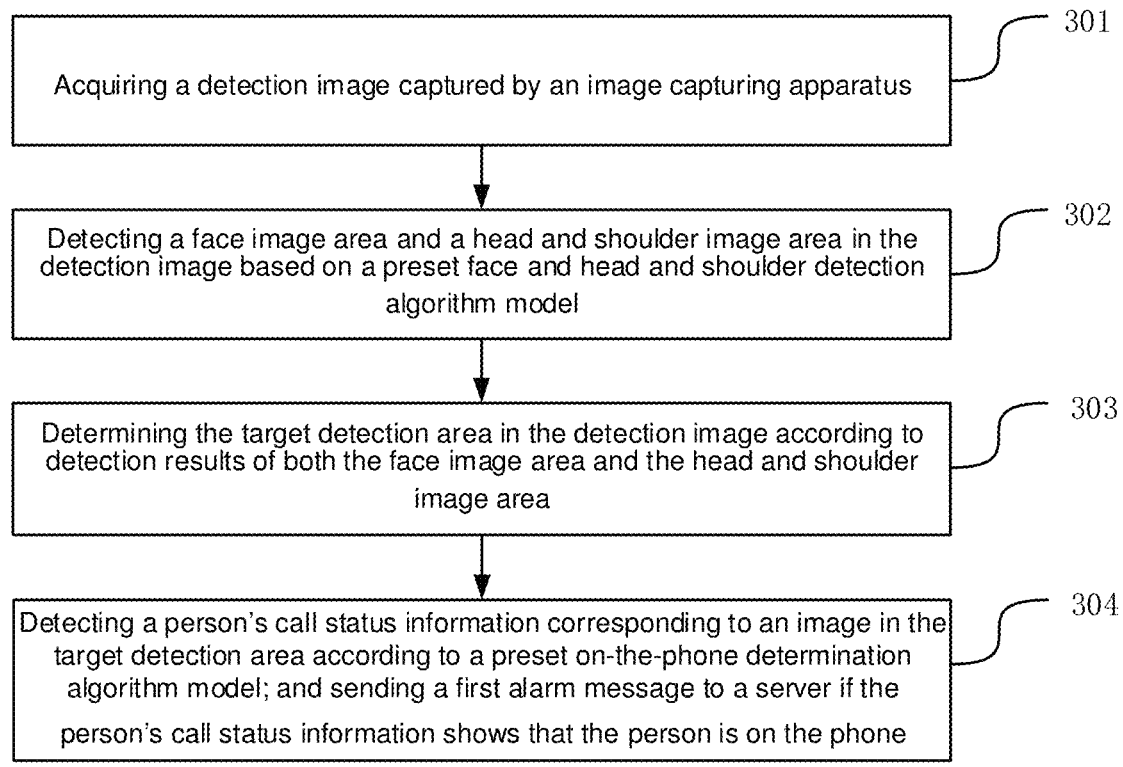
FIG. 3 is a flow chart of a method for sending an alarm message according to an embodiment of the present disclosure.

A processing flow chart shown in FIG. 3 will be described in detail by taking an apparatus for capital business (for example, an ATM) as an example in conjunction with the specific implementation below, and the details are as follows.

In step 301, a detection image captured by an image capturing apparatus is acquired.

In the implementation, the image capturing apparatus around an ATM can capture an image in an on state, and can send the captured image (i.e., the detection image) to a terminal in real time. The terminal can receive the detection image sent by the image capturing apparatus, and store the detection image. In addition, the image capturing apparatus may further send its corresponding identifier of the ATM to the terminal; and the terminal may correspondingly store the detection image and the identifier of the ATM.

In step 302, a face image area and a head and shoulder image area are detected in the detection image based on a preset face and head and shoulder detection algorithm model.

In the implementation, a terminal may store the preset face and head and shoulder detection algorithm model which may be obtained by training in advance. After acquiring the detection image, the terminal can detect the face image area and the head and shoulder image area in the acquired detection image. Specifically, according to pixel values (such as a red channel value, a green channel value, and a blue channel value) of each pixel in the detection image and the face and head and shoulder detection algorithm model, in the detection image, a tentative face image area and a tentative head and shoulder image area are determined. The tentative face image area may be the face image area and the tentative head and shoulder image area may be the head and shoulder image area. A confidence level corresponding to the tentative face image area and a confidence level corresponding to the tentative head and shoulder image area can be determined. Wherein, the confidence level can be used to reflect the probability of a detected image being a face image (or a head and shoulder image). The terminal may further store a first confidence level threshold corresponding to the face image area and a second confidence level threshold corresponding to the head and shoulder image area. The first confidence level threshold may be the same as or different from the second confidence level threshold.

After determining the confidence level corresponding to the tentative face image area, the confidence level corresponding to the tentative head and shoulder image area, the first confidence level threshold, and the second confidence level threshold, the terminal may compare the confidence level corresponding to the tentative face image area with the first confidence level threshold, and compare the confidence level corresponding to the tentative head and shoulder image area with the second confidence level threshold respectively. If the terminal determines that the confidence level of the detected tentative face image area is greater than or equal to the first confidence level threshold, tentative face image area can be used as the face image area; otherwise, the tentative face image area is determined not to be the face image area. If the terminal determines that the confidence level of the detected tentative head and shoulder image area is greater than or equal to the second confidence level threshold, the tentative head and shoulder image area may be used as the head and shoulder image area. Otherwise, that the tentative head and shoulder image area is determined not to be the head and shoulder image area.

Optionally, the face and head and shoulder detection algorithm model may have an error. Therefore, detection results may be filtered according to the position information of the detected face image area and/or head and shoulder image area, and a corresponding processing procedure may be as follows. Based on the preset face and head and shoulder detection algorithm model, the tentative face image area and the tentative head and shoulder image area are determined in the detection image, and the confidence level corresponding to the tentative face image area and the confidence level corresponding tentative head and shoulder image area are determined. A weight value corresponding to the tentative face image area and a weight value corresponding to the tentative head and shoulder image area are determined according to a pre-stored corresponding relationship between the position information and the weight. If the confidence level corresponding to the tentative face image area is greater than a preset first confidence level threshold, and the weight value corresponding to the tentative face image area is greater than a preset first weight value threshold, the tentative face image area is used as the face image area. If the confidence level of the tentative head and shoulder image area is greater than a preset second confidence level threshold, and the weight value corresponding to the tentative head and shoulder image area is greater than a preset second weight value threshold, the tentative head and shoulder image area is used as the head and shoulder image area.

In the implementation, the terminal may determine the tentative face image area and the tentative head and shoulder image area in the detection image based on the preset face and head and shoulder detection algorithm model, and determine the confidence level corresponding to the tentative face image area as well as the confidence level corresponding to the tentative head and shoulder image area. The specific process is similar to that described above, and will not be repeated. After determining the tentative face image area and the tentative head and shoulder image area, the terminal may determine the position information of the tentative face image area and the position information of the tentative head and shoulder image area based on the face and head and shoulder detection algorithm model. The corresponding relationship between the position information and the weight may be pre-stored in the terminal, and may include a corresponding relationship between the position information and the weight value of the tentative face image area, and a corresponding relationship between the position information and the weight value of the tentative head and shoulder image area. After determining the position information of the tentative face image area and the position information of the tentative head and shoulder image area, the terminal may acquire the weight value corresponding to the position information of the detected tentative face image area as well as and the weight value corresponding to the position information of the detected tentative head and shoulder image area from the above corresponding relationship. Wherein, the weight value may reflect the importance of the detected tentative face image area (or the tentative head and shoulder image area). If the position information of the tentative face image area (or the tentative head and shoulder image area) shows that the tentative face image area (or the tentative head and shoulder image area) is located in the middle of the detection image, the corresponding weight value is higher. If the position information of the tentative face image area (or the tentative head and shoulder image area) shows that the tentative face image area (or the tentative head and shoulder image area) is located at the edge of the detection image, the corresponding weight value is lower. The terminal may further store the first weight value threshold corresponding to the face image area and a second weight value threshold corresponding to the head and shoulder image area. The first weight value threshold may be the same as or different from the second weight value threshold.

For the tentative face image area, after determining the confidence level corresponding to the tentative face image area and the first confidence level threshold, the terminal may compare the confidence level corresponding to the tentative face image area with the first confidence level threshold. If the terminal determines that the confidence level of the detected tentative face image area is less than the first confidence level threshold, it can be determined that the tentative face image area is not the face image area. Or, if the terminal determines that the confidence level corresponding to the detected tentative face image area is greater than or equal to the first confidence level threshold, the terminal may further compare the weight value corresponding to the tentative face image area with the first weight value threshold. If the weight value corresponding to the tentative face image area is greater than or equal to the first weight value threshold, the tentative face image area can be used as the face image area. Otherwise, it can be determined that the tentative face image area is not the face image area. For the tentative head and shoulder image area, after determining the confidence level corresponding to the tentative head and shoulder image area and the second confidence level threshold, the terminal may compare the confidence level corresponding to the tentative head and shoulder image area with the second confidence level threshold. If the terminal determines that the confidence level of the tentative head and shoulder image area is less than the second confidence level threshold, it can be determined that the tentative head and shoulder image area is not the head and shoulder image area. If the terminal determines that the confidence level corresponding to the detected tentative head and shoulder image area is greater than or equal to the second confidence level threshold, the terminal may further compare the weight value corresponding to the tentative head and shoulder image area with the second weight value threshold. If the weight value corresponding to the tentative head and shoulder image area is greater than or equal to the second weight value threshold, the tentative head and shoulder image area may be used as the head and shoulder image area. Otherwise, it can be determined that the tentative head and shoulder image area is not the head and shoulder image area. In this way, incorrect detection can be effectively avoided, and the accuracy of detecting the face image area and the head and shoulder image area can be improved.

Optionally, after acquiring the detection image, the terminal may first detect whether there is a person around the ATM. If yes, the terminal may execute the process of step 302; and the corresponding processing procedure may be as follows. If a preset detection trigger condition is fulfilled, the terminal may perform the step of detecting the face image area and the head and shoulder image area in the detection image based on the preset face and head and shoulder detection algorithm model.

In the implementations, the preset detection trigger conditions may be various. The embodiment provides several feasible processing manners.

In the first manner, the terminal may perform the processing of step 302 when detecting person's activity information in the detection image.

In the implementation, the terminal may acquire a detection image captured by an image capturing apparatus of an ATM, and may establish a corresponding background model according to the detection image. In addition, the terminal may further periodically update the background model according to the detection image. For every frame of a detection image that the downstream terminal acquires, the terminal may compare the detection image with the background model to determine a foreground image, and may binarize the foreground image to generate a binary foreground image. The terminal determines whether there is a person in the detection image according to the binary foreground image. In addition, the terminal can also determine whether there is a person around the ATM by determining the size of a motion area in the detection image besides determining whether there is a person in the detection image according to the foreground image. Specifically, after acquiring the detection image, the terminal may acquire a previous frame of the detection image of the currently acquired detection image. Further, according to a gray value of each pixel in two adjacent frame images, the terminal may calculate a difference of the gray values of the pixels (which may be referred to as a dissimilarity) at the same position in the two adjacent frame images. After obtaining the dissimilarity of each pixel, the terminal may determine a pixel whose dissimilarity is greater than a preset threshold in the all pixels, so as to obtain the motion area of the detection image. If the terminal detects the foreground image in each detection image within the preset period, and the motion area in each detection image is greater than a preset threshold, it can be determined that there is a person around the ATM.

In the second manner, the terminal may perform the processing of step 302 when receiving an operation notification message sent by a target apparatus.

Wherein, the target apparatus may be an apparatus for capital business, such as an ATM.

In the implementation, when a user operates in the target apparatus, the target apparatus may detect an instruction input by the user, and then may send the operation notification message to the terminal. The operation notification message may carry an apparatus identifier of the target apparatus. Correspondingly, the terminal may receive the operation notification message sent by the target apparatus. After acquiring the detection image, the terminal may determine whether the operation notification message sent by the target apparatus is received. If yes, the terminal may perform the processing of step 302.

In the third manner, the terminal may perform the processing of step 302 when receiving an object detection notification sent by a sensing apparatus.

In the implementation, a sensor (such as an infrared sensor) may be arranged around or in the ATM. When the user is close to the ATM, the sensor can detect a corresponding detection signal, and then can send the object detection notification to the terminal, wherein the object detection notification may carry the apparatus identifier of the target apparatus. Correspondingly, the terminal may receive the object detection notification sent by the sensing apparatus. After acquiring the detection image, the terminal may determine whether the object detection notification sent by the sensing apparatus is received. If yes, the terminal may perform the processing of step 302.

Optionally, the face and head and shoulder detection algorithm model may be obtained by training in advance. Correspondingly, a process of training the face and head and shoulder detection algorithm model may be as follows: acquiring a plurality of pre-stored training samples including an image sample, and a face image area and/or a head and shoulder image area in the image sample; and training a preset first initial algorithm model based on the plurality of training samples to obtain the face and head and shoulder detection algorithm model.

In the implementation, the terminal can train a face and head and shoulder detector by adopting a high-performance deep-learning network architecture (such as the faster-rcnn) and an efficient ZF (Matthew D. Zeiler and Rob Fergus) improved network model. The training samples may include a positive training sample and a negative training sample. The positive training sample may include an image sample, and a face image area and/or a head and shoulder image area in the image sample; and the image sample may be a face image and a head and shoulder image from different angles.

The face image area and/or the head and shoulder image area may be represented by coordinate information of the face image area and/or the head and shoulder image area. The negative training samples may include an image sample, as well as none face image area or the head and shoulder image area in the image sample. The none face image area or the head and shoulder image in the image sample refers to the area which is neither the face image area nor the head and shoulder image area in the image sample. The terminal may train the preset first initial algorithm model based on the plurality of training samples and the preset training algorithm so as to obtain the face and head and shoulder detection algorithm model. Both the target detection rate and the detection accuracy rate of the face and head and shoulder detection algorithm model trained based on a deep-learning technology are increased greatly.

In step 303, the target detection area is determined in the detection image according to detection results of both the face image area and the head and shoulder image area.

Figure 4:
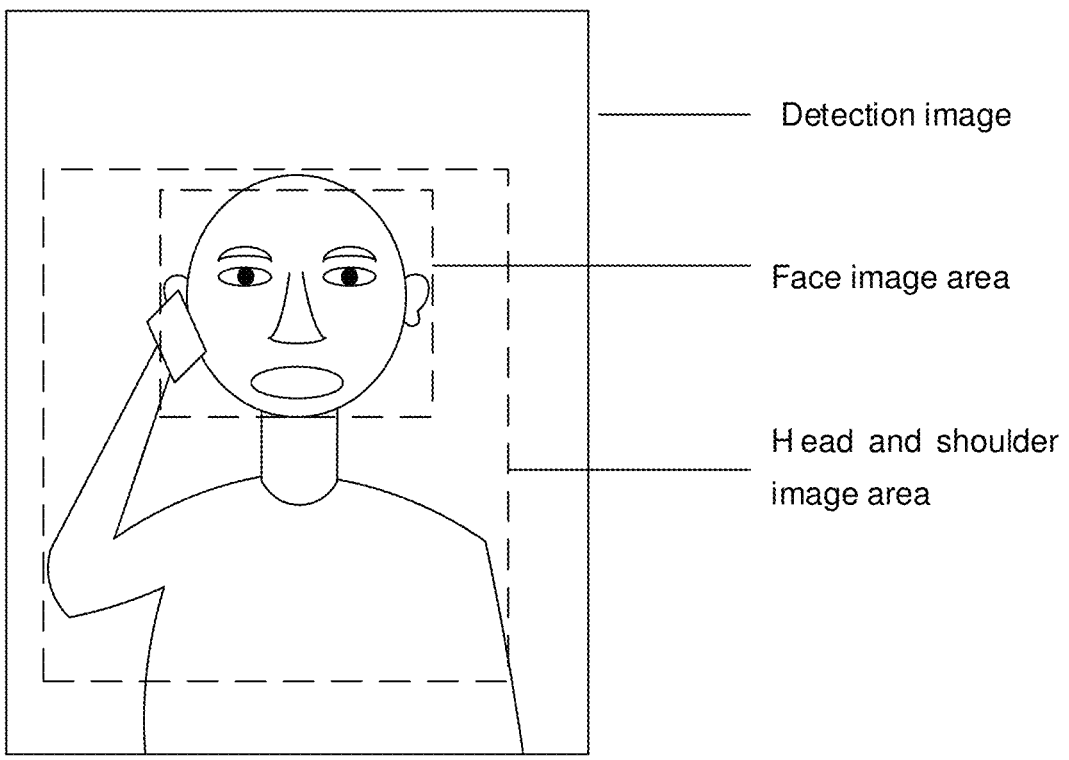
FIG. 4, FIG. 5, and FIG. 6 are schematic diagrams of a detection result provided by an embodiment of the present disclosure.
Figure 5:
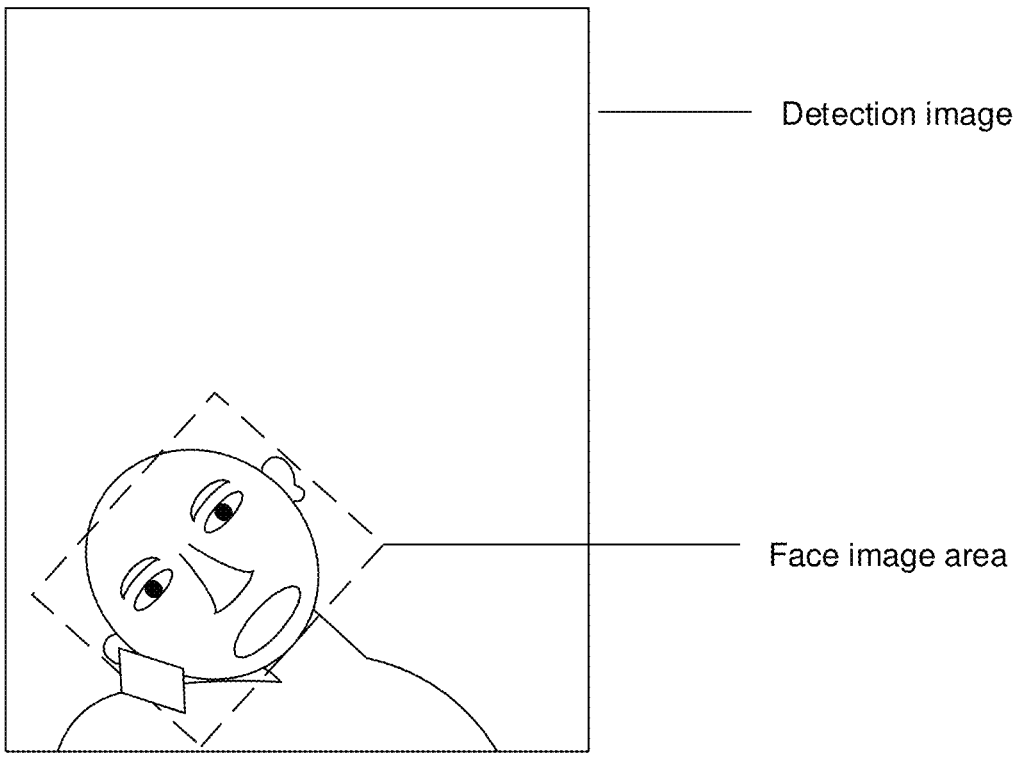
Figure 6:
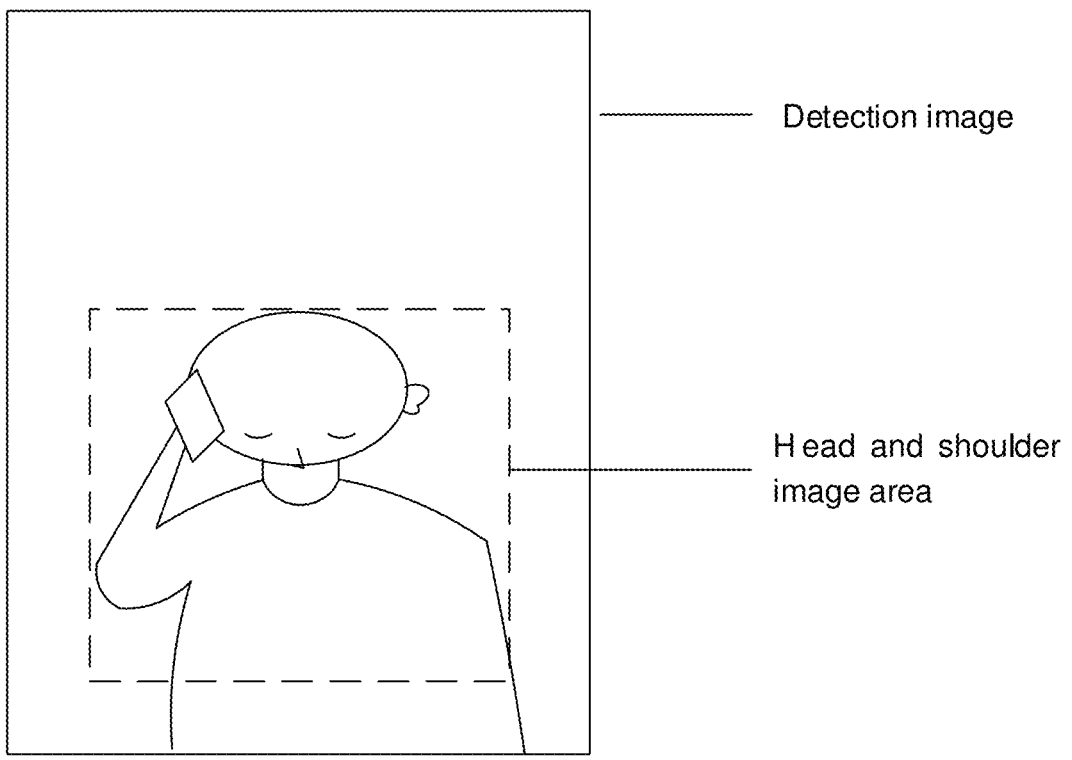

In the implementation, after detecting the face image area and the head and shoulder image area in the detection image, the terminal may detect the face image area and the head and shoulder image area as shown in FIG. 4. Or, the terminal may only detect the face image, or may only detect the head and shoulder image area, as shown in FIGS. 5 and 6. After detecting the face image area and the head and shoulder image area, the terminal may determine the target detection area in the detection image based on the obtained detection results.

Optionally, based on the difference in the detection results, the manners in which the terminal determines the target detection area in the detection image are also different. Correspondingly, the processing procedure of step 303 may be as follows. If the face image area and the head and shoulder image area are detected, the target detection area is determined in the detection image according to a pre-stored positional relationship among the face image area, the head and shoulder image area, and the detection area. Or, if the face image area is detected but the head and shoulder image area is not detected, the detected face image area is enlarged, and the enlarged face image area is used as the target detection area. Or, if the head and shoulder image area is detected but the face image area is not detected, the detected head and shoulder image area is reduced, and the reduced head and shoulder image area is used as the target detection area.

Figure 7:
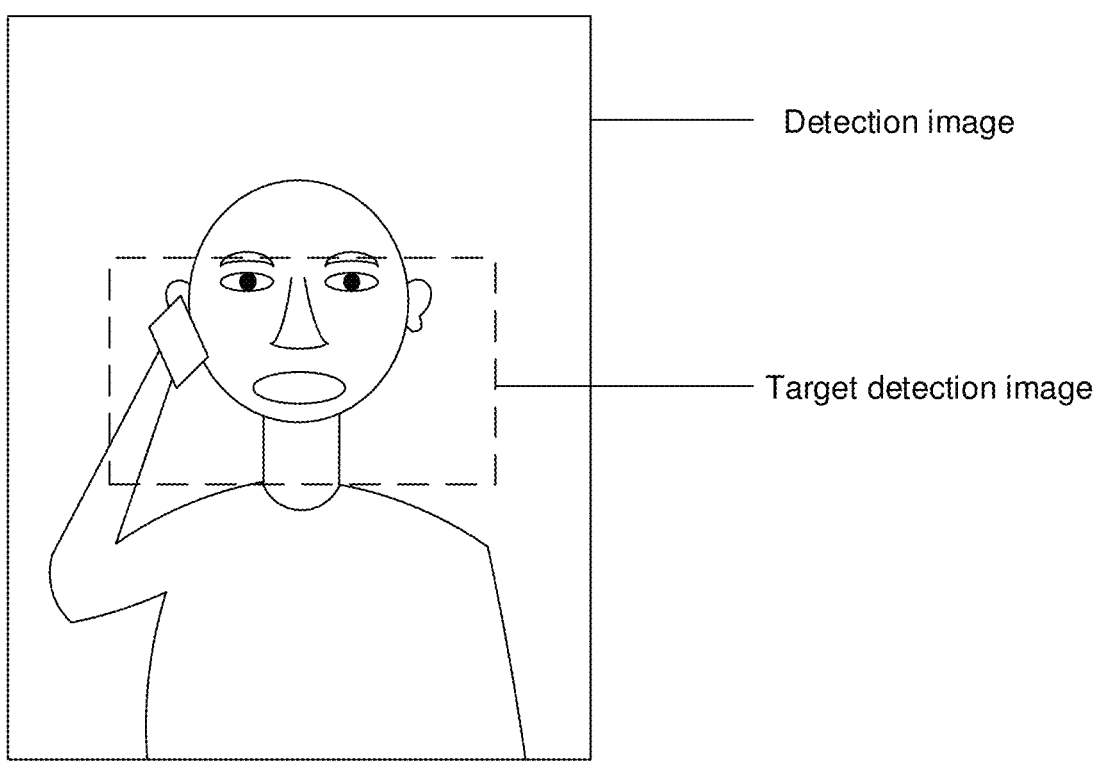
FIG. 7, FIG. 8, and FIG. 9 are schematic diagrams of a target detection area provided by an embodiment of the present disclosure.

In the implementation, if the terminal detects the face image area and the head and shoulder image area, the target detection area can be determined in the detection image according to the pre-stored positional relationship among the face image area, the head and shoulder image area, and the detection area as well as the determined face image area and head and shoulder image area. For example, a human eye position in the face image area and a neck position in the head and shoulder image area can be determined; and then the target detection area can be determined in the area below the human eye position and above the neck position, as shown in FIG. 7. The target detection area may be a rectangular area.

Figure 8:
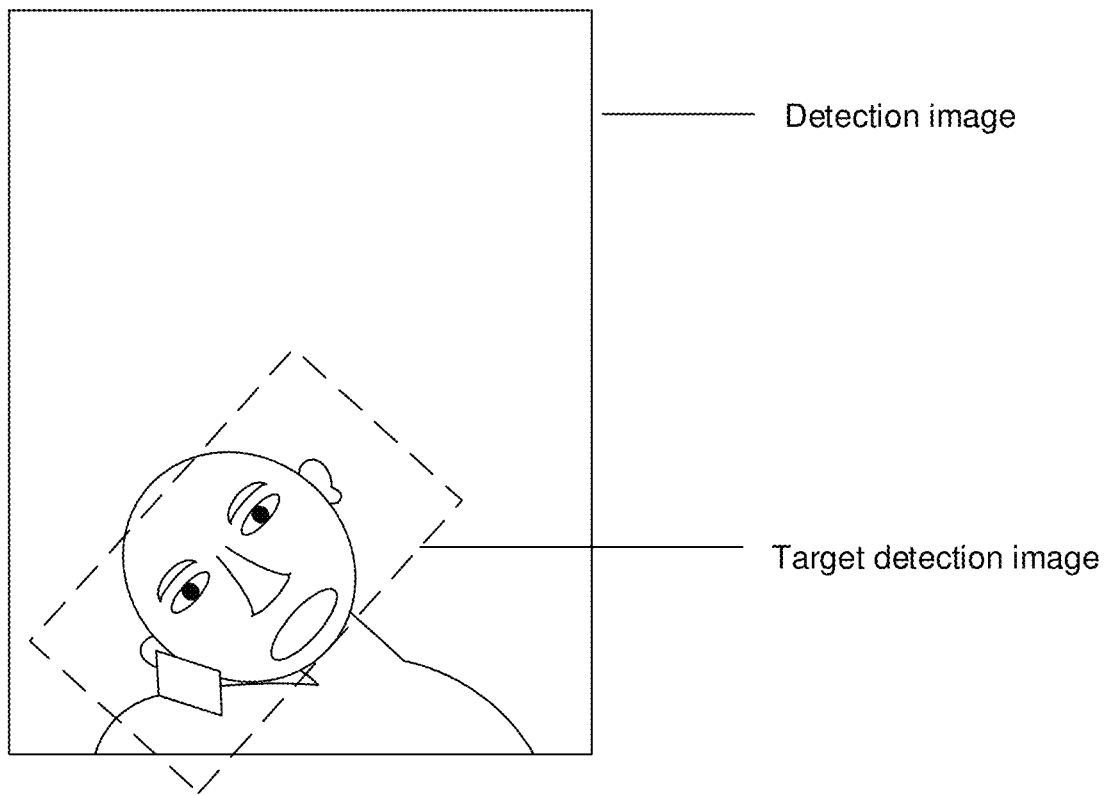

If the terminal only detects the face image area but does not detect the head and shoulder image area, the face image area may be enlarged in the detection image according to a preset enlarging coefficient; and the enlarged face image area is used as the target detection area. An enlarging coefficient corresponding to the width of the face image area may be greater than that corresponding to the length of the face image area, as shown in FIG. 8. That is, the target detection area is an area including the face image area in the detection image.

Figure 9:
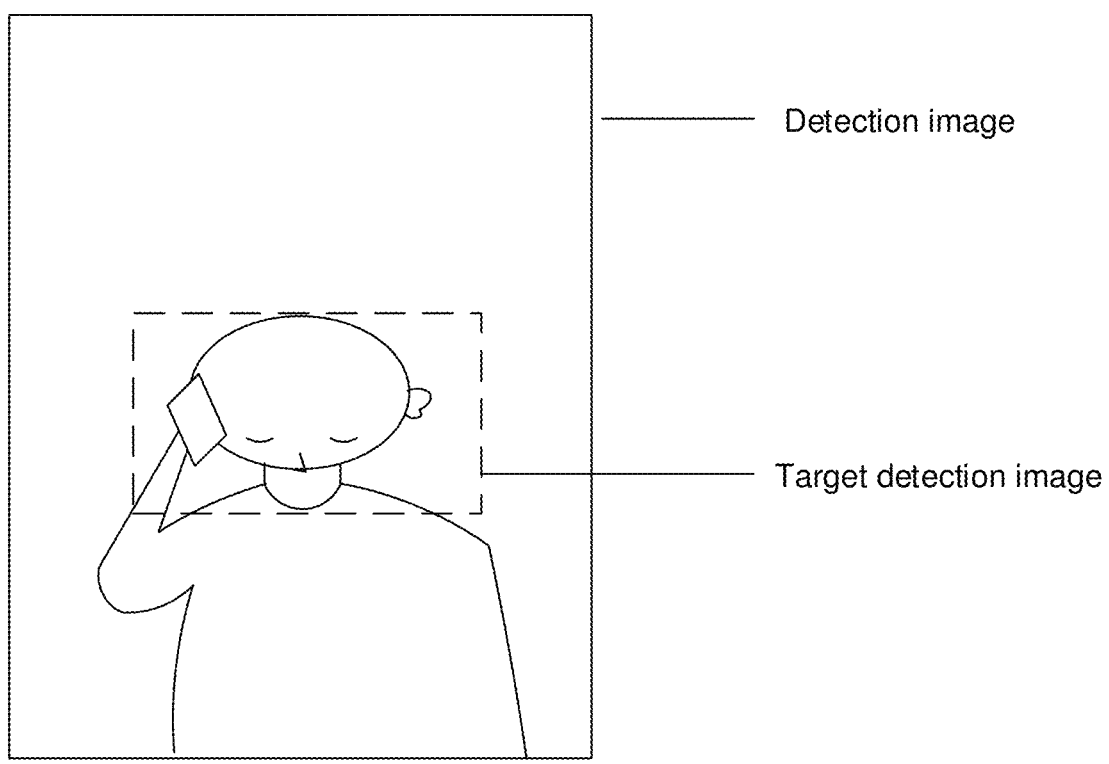

If the terminal only detects the head and shoulder image area but does not detect the face image area, the detected head and shoulder image area may be reduced in the detection image according to a preset reducing coefficient; and the reduced head and shoulder image area is used as the target detection area. Wherein, a reducing coefficient corresponding to the width of the head and shoulder image area may be less than that corresponding to the length of the head and shoulder image area, as shown in FIG. 9. In addition, if neither the face image area nor the head and shoulder image area is detected, the terminal may not perform processing. That is, the target detection area is an area in the head and shoulder image area.

In step 304, a person's call status information corresponding to an image in the target detection area is detected according to a preset on-the-phone determination algorithm model; and a first alarm message is sent to a server if the person's call status information shows that the person is on the phone.

In the implementation, the terminal may store the preset on-the-phone determination algorithm model which can be obtained through training. After determining the target detection area, the terminal may detect the person's call status information corresponding to the image in the target detection area according to the preset on-the-phone determination algorithm model. Wherein, the person's call status information may show that the person is on the phone or not on the phone.

Optionally, the terminal may count the number of frames of the detection images when the person's call status information shows that the person is on the phone. If the number of the frames is greater than a preset threshold, a first alarm message may be sent to the server. That is, if the person's call status information shows that the person is on the phone, and the number of the frames of the detection images when the person's call status information shows that the person is on the phone within the preset period is greater than the preset threshold, the first alarm message may be sent to the server. Alternatively, the terminal may count the number of frames of the detection images when the person's call status information shows that the person is on the phone within the preset period, and if a ratio of the number of the frames to the number of the total frames of the detection images acquired within the preset period is greater than a preset ratio threshold, the first alarm message may be sent to the server. That is, if the person's call status information—shows that the person is on the phone, and the ratio of the number of frames of the detection images when the person's call status information that the person is on the phone within the preset period to the total frames of the detection images acquired within the preset period is greater than the preset ratio threshold, the first alarm message may be sent to the server.

Figure 10:
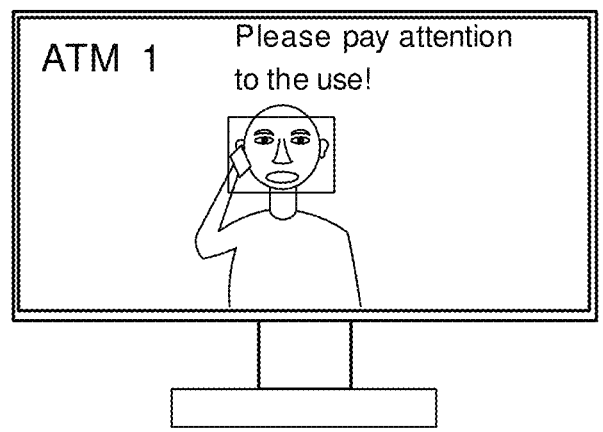
FIG. 10 is a schematic diagram of a display interface according to an embodiment of the present disclosure.

The first alarm message may carry an identifier of an ATM. After receiving the first alarm message, the server may send the first alarm notification message carrying the identifier of the ATM to the terminal of the security guard, so as to alert the security guard of paying attention the use who is using a target apparatus, wherein the target apparatus is an apparatus that corresponds to the identifier of the ATM. The terminal may further add a marker image to the detection image according to the detected face image area or head and shoulder image area, so as to delineate the person in the detection image. If the person's call status information shows that the person is on the phone, the terminal may send the detection image with the marker image to the server. The server may send the detection image with the marker image to a terminal of the security guard to facilitate the security guard to find the corresponding user, as shown in FIG. 10. That is, the first alarm message may further carry the detection image with the marker image. Correspondingly, the first alarm notification message may further carry the detection image with the marker image. In addition, the terminal can further output preset anti-fraud voice information through a voice broadcast apparatus while sending the first alarm message, so as to alert the user of preventing himself from being swindled in time.

Optionally, the processing procedure of training the on-the-phone determination algorithm model by the terminal may be as follows: acquiring a plurality of pre-stored training samples including an image sample, and a person's call status information corresponding to the image sample; and training a preset second initial algorithm model based on the plurality of training samples to obtain the on-the-phone determination algorithm model.

In the implementation, the terminal can train the on-the-phone determination algorithm model by adopting a deep-learning network improved model (such as googlenet-loss1). The training samples may include a positive training sample and a negative training sample. Wherein, the image sample in the positive training sample may be an image including a person who is on the phone, and may be an image of different calling gestures, such as holding a phone with the left hand, holding a phone with the right hand, holding a phone with a hand to opposite ear, cradling a phone between the head and the shoulder, and other gestures. That is, the person's call status information corresponding to the positive training sample may show that the person is on the phone. The negative training sample may be an image not including a person who is on the phone. That is, the person's call status information corresponding to the negative training sample may show that the person is not on the phone. A preset second initial algorithm model may be stored in the terminal, and may include a tentative parameter. The terminal may train the preset second initial algorithm model according to the plurality of pre-stored training samples to obtain a training value of the tentative parameter. That is, on-the-phone determination algorithm model can be obtained. The detection accuracy of the on-the-phone determination algorithm model trained based on the deep-learning technology is greatly improved compared with that in a traditional method (such as SVM), and incorrect detections caused by hair, eyes and other interference factors can be eliminated.

Optionally, the voice recognition technology may be combined to identify a user that may be swindled. The corresponding processing procedure may be as follows:

acquiring voice information detected by a voice input apparatus; and if the voice information includes a preset keyword, sending a second alarm message to the server.

In the implementation, the voice input apparatus may be mounted on or around the ATM. When a person within a certain distance from the ATM makes a sound, the voice input apparatus can detect the corresponding voice information, and can send the detected voice information to the terminal. Correspondingly, the terminal can receive the voice information sent by the voice input apparatus. After receiving the voice information, the terminal may determine whether the voice information includes a preset keyword, such as a card number, a transaction, or the like, based on a pre-stored voice recognition algorithm. Wherein, the voice recognition algorithm may be trained by the terminal by adopting a voice recognition algorithm model. For example, the terminal can establish models for sensitive vocabularies (i.e., keywords) frequently found in the telecom fraud according to an MFCC (Med-Frequency Cepstral Coefficients) voiceprint feature and an HMM (Hidden Markov Model) in the related art, and can extract a voiceprint feature of a sound file in a database. Further, the terminal can establish an HMM model corresponding to each keyword, and trains each HMM model by using the MFCC voiceprint feature to obtain the voice recognition algorithm.

If the terminal recognizes that the voice information includes a preset keyword through the voice recognition algorithm, a second alarm message may be sent to the server. After receiving the second alarm message, the server may send a second alarm notification message carrying the identifier of the target apparatus to the terminal of the security guard, so as to alert the security guard to intervene in the transaction being made by the user who is using the target apparatus, thereby preventing the user from transferring money to a fraudster.

Optionally, the terminal may continuously track the detected person to avoid repeatedly sending the alarm message. The corresponding processing procedure may be as follows: determining a similarity between a currently detected face image area and/or head and shoulder image area and a face image area and/or head and shoulder image area in a previous frame of detection image closest to the current time; and performing the step of sending the first alarm message to the server if the similarity does not satisfy the preset similarity condition.

In the implementation, after detecting the face image area and/or the head and shoulder image area, the terminal may determine a similarity between a currently detected face image area and/or head and shoulder image area and a face image area and/or head and shoulder image area in a previous frame of detection image closest to the current time. Specifically, after detecting the face image area and/or the head and shoulder image area, the terminal may generate a target frame corresponding to the face image area and/or the head and shoulder image area. Taking the target frame corresponding to the face image area as an example, after determining the target frame, the terminal may determine the attribute information of the target frame, wherein the attribute information may include a gray value of a pixel in the target frame as well as size information and position information of the target frame. Further, the attribute information of the target frame in a currently received detection image may be compared with attribute information of the target frame in the previous frame of detection image closest to the current time to determine the similarity therebetween. The similarity can be used as the similarity between the currently detected face image area and the face image area in the previous frame of detection image closest to the current time.

For example, an average value of values of the pixel difference in the target frame can be calculated to obtain a gray level dissimilarity. A size ratio value can be calculated to obtain a size dissimilarity. A position dissimilarity can be calculated according to the coordinate information. If the gray level dissimilarity is less than a preset first dissimilarity threshold, the size dissimilarity is less than a preset second dissimilarity threshold, and the position dissimilarity is less than a preset third dissimilarity threshold, it can be determined that the similarity therebetween is high. Otherwise, it can be determined that the similarity therebetween is low.

After determining the similarity, if the terminal determines that the similarity is low, it indicates that the user in the current detection image may be different from the user in the previous frame of detection image; and the terminal may perform the step of sending the first alarm message to the server. That is, after detecting the person's call status information corresponding to the image in the target detection area, if the person's call status information shows that the person is on the call, and it is determined that the above similarity does not satisfy the preset similarity condition, the step of sending the first alarm message to the server is performed. If the terminal determines that the similarity is high, it indicates that the user in the current detection image may be the same as the user in the previous frame image; based on the above processing, the terminal has sent the alarm message corresponding to the user to the server, so that there is no need to send the alarm message to the server again, thereby avoiding repeatedly alarming the same user.

In practice, the target frame corresponding to the face image area call be used for determination preferentially. If the face image area is not detected, the target frame corresponding to the head and shoulder image area can be used for determination. The specific processing procedure is similar to the above process, and will not be repeated herein.

It should be noted that the above marker image may be a target frame image generated by the terminal. If the terminal detects the face image area and/or the head and shoulder image area in the previous frame of detection image, but not in the current detection image, the target frame image corresponding to the previous frame of detection image may be added into the current detection image, so as to facilitate the display on the terminal of the security guard. If the terminal does not detect the face image area and/or the head and shoulder image area in the preset number of frames of continuous detection images, the addition of the target frame image into the detection image can be stopped. In practice, there is a detection error in the face and head and shoulder detection algorithm model, resulting in discontinuous detection results. Correspondingly, the display of the target frame image is not continuous. As a result, the target frame image in the detection image seen by the security guard is sporadic, or even flickering. However, based on the processing of the present disclosure, the display continuity of the target frame images can be improved, and the user experience can be effectively improved.

Optionally, in order to prevent the alarm message from repeatedly sending to the same user within a preset period, the corresponding processing procedure may be as follows: determining a similarity between a currently detected face image area and/or head and shoulder image area and a face image area and/or head and shoulder image area in each frame of detection image acquired within the preset period; and if none of the obtained similarities satisfies a preset similarity condition, performing the step of sending the first alarm message to the server.

In the implementation, after detecting the face image area and/or the head and shoulder image area in the currently acquired detection image, the terminal may acquire the face image area and/or the head and shoulder image area in each frame of detection image acquired within the preset period. Further, according to the above manner, the similarity between a currently detected face image area and/or head and shoulder image area and a face image area and/or head and shoulder image area in each frame of detection image acquired within the preset period can be determined. If none of the obtained similarities satisfies the preset similarity condition (which indicates that the user in the current detection image may be different from the users in other frame of detection images within the preset period), the terminal may perform the step of sending the first alarm message to the server. That is, after detecting the person's call status information corresponding to the image in the target detection area, if the person's call status information shows that the person is on the call, and it is determined that none of the similarities satisfies the preset similarity condition, the step of sending the first alarm message to the server is performed. If there is one similarity that satisfies the preset similarity condition (which indicates that the user in the current detection image may be the same as one of the users in other frame of detection images within the preset period) among all similarities, based on the above processing, the terminal has sent the alarm message corresponding to the user to the server, so that there is no need to send the alarm message to the server again, thereby avoiding repeatedly alarming the same user.

In the embodiment of the present disclosure, after the terminal acquires the detection image captured by the image capturing apparatus, the target detection area can be determined in the detection image; the person's call status information corresponding to the image in the target detection area is detected according to the preset on-the-phone determination algorithm model; and the first alarm message is sent to the server if the person's call status information shows that the person is on the phone. In this way, whether a user is on the phone can be recognized in time; and the alarm message can be sent in time when it is detected that the user is on the phone to inform the security guard in time that there may be a swindled user, and to take measures to prevent the user from property loss.

Figure 11:
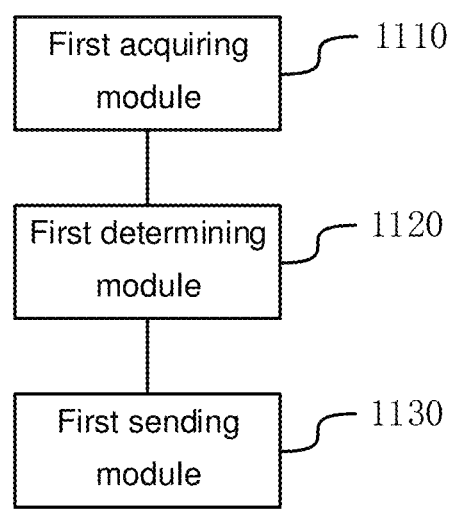
FIG. 11 is a schematic structural diagram of a device for sending an alarm message according to an embodiment of the present disclosure.

Based on the same technical concept, the embodiments of the present disclosure further provide a device for sending an alarm message. As shown in FIG. 11, the device includes:

a first acquiring module 1100, configured to acquire a detection image captured by an image capturing apparatus;

a first determining module 1120, configured to determine a target detection area in the detection image; and a first sending module 1130, configured to detect a person's call status information corresponding to an image in the target detection area according to a preset on-the-phone determination algorithm model, and send a first alarm message to a server if the person's call status information shows that the person is on the phone.

Figure 12:
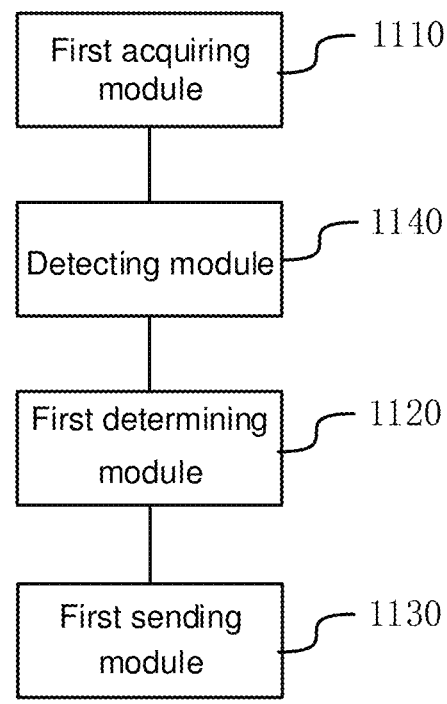
FIG. 12 is a schematic structural diagram of a device for sending an alarm message according to an embodiment of the present disclosure.

Optionally, as shown in FIG. 12, the device further includes:

a detecting module 1140, configured to detect a face image area and a head and shoulder image area in the detection image based on a preset face and head and shoulder detection algorithm model, wherein the first determining module 1120 is configured to determine the target detection area in the detection image according to detection results of both the face image area and the head and shoulder image area.

Optionally, the first determining module 1120 is configured to:

if the face image area and the head and shoulder image area are detected, determine the target detection area in the detection image according to a pre-stored positional relationship among the face image area, the head and shoulder image area, and a detection area; or if the face image area is detected but the head and shoulder image area is not detected, enlarge the detected face image area, and use the enlarged face image area as the target detection area; or if the head and shoulder image area is detected but the face image area is not detected, reduce the detected head and shoulder image area, and use the reduced head and shoulder image area as the target detection area.

Figure 13:
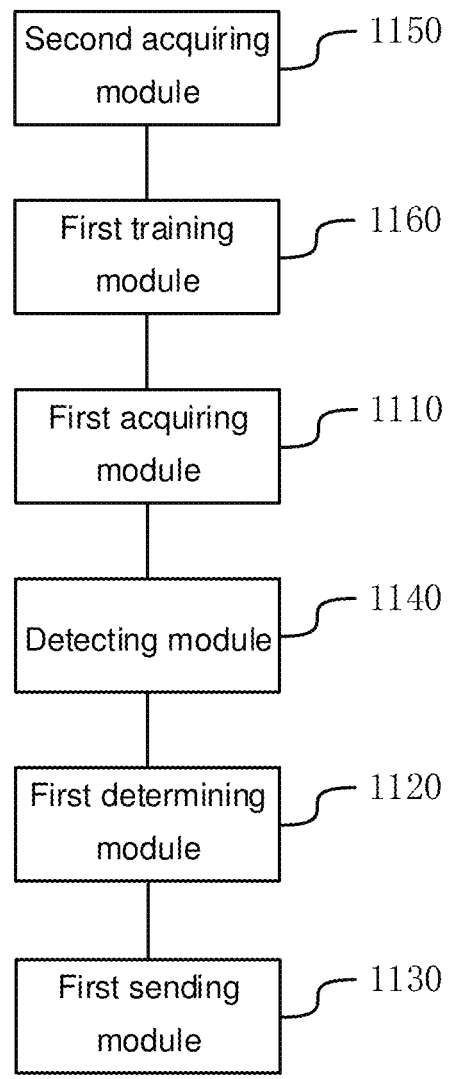
FIG. 13 is a schematic structural diagram of a device for sending an alarm message according to an embodiment of the present disclosure.

Optionally, as shown in FIG. 13, the device further includes:

a second acquiring module 1150, configured to acquire a plurality of pre-stored training samples including an image sample, and acquire a face image area and/or a head and shoulder image area in the image sample; and a first training module 1160, configured to train a preset first initial algorithm model based on the plurality of training samples to obtain the face and head and shoulder detection algorithm model.

Figure 14:
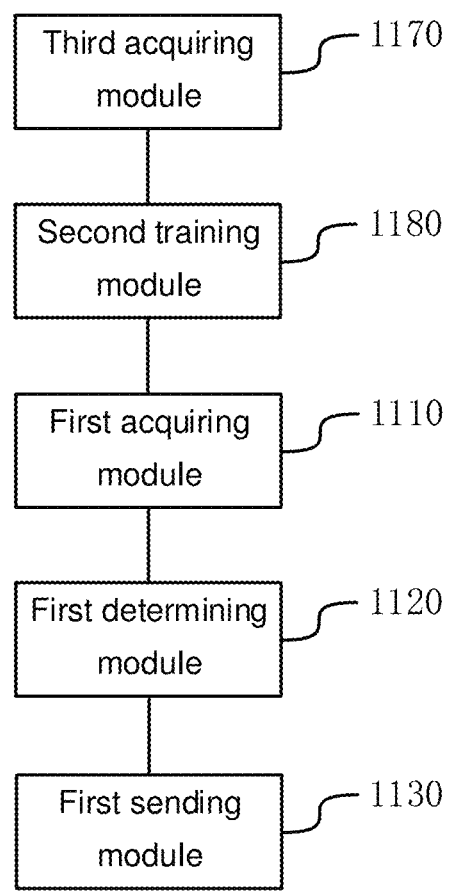
FIG. 14 is a schematic structural diagram of a device for sending an alarm message according to an embodiment of the present disclosure.

Optionally, as shown in FIG. 14 the device further includes:

a third acquiring module 1170, configured to acquire a plurality of pre-stored training samples including an image sample, and acquire a person's call status information corresponding to the image sample; and a second training module 1180, configured to train a preset second initial algorithm model based on the plurality of training samples to obtain the on-the-phone determination algorithm model.

Figure 15:
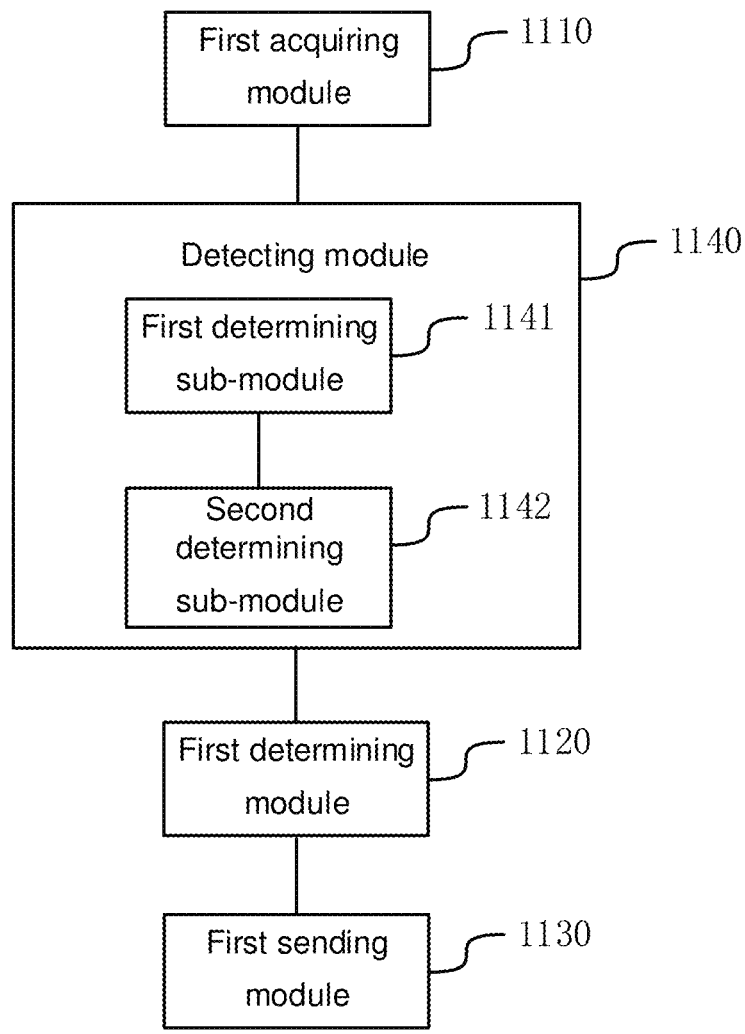
FIG. 15 is a schematic structural diagram of a device for sending an alarm message according to an embodiment of the present disclosure.

Optionally, as shown in FIG. 15, the detecting module 1140 includes:

a first determining sub-module 1141, configured to determine a tentative face image area and a tentative head and shoulder image area in the detection image based on the preset face and head and shoulder detection algorithm model, and determine a confidence level corresponding to the tentative face image area as well as a confidence level corresponding to the tentative head and shoulder image area;

a second determining sub-module 1142, configured to determine a weight value corresponding to the tentative face image area and a weight value corresponding to the tentative head and shoulder image area according to a pre-stored corresponding relationship between position information and weight, wherein the second determining sub-module 1142 is further configured to: if the confidence level corresponding to the tentative face image area is greater than a preset first confidence level threshold, and the weight value corresponding to the tentative face image area is greater than a preset first weight value threshold, use the tentative face image area as the face image area; and the second determining sub-module 1142 is further configured to: if the confidence level of the tentative head and shoulder image area is greater than a preset second confidence level threshold, and the weight value corresponding to the tentative head and shoulder image area is greater than a preset second weight value threshold, use the tentative head and shoulder image area as the head and shoulder image area.

Figure 16:
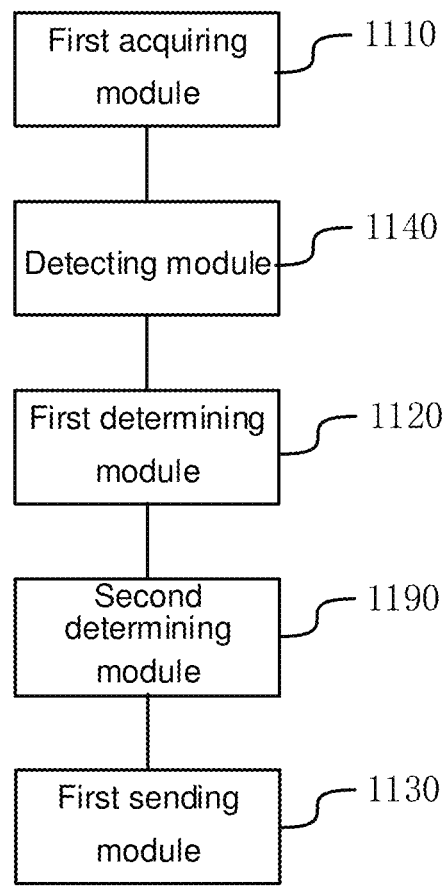
FIG. 16 is a schematic structural diagram of a device for sending an alarm message according to an embodiment of the present disclosure.

Optionally, as shown in FIG. 16, the device further includes:

a second determining module 1190, configured to determine a similarity between a currently detected face image area and/or head and shoulder image area and a face image area and/or head and shoulder image area in a previous frame of detection image closest to the current time, wherein the first sending module 1130 is configured to:

if the similarity does not satisfy a preset similarity condition, perform the step of sending the first alarm message to the server.

Figure 17:
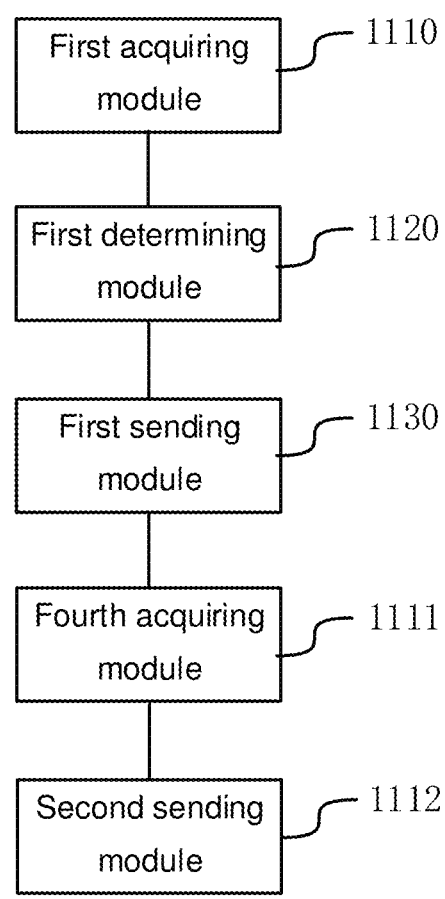
FIG. 17 is a schematic structural diagram of a device for sending an alarm message according to an embodiment of the present disclosure.

Optionally, as shown in FIG. 17, the device further includes:

a fourth acquiring module 1111, configured to acquire voice information detected by a voice input apparatus; and a second sending module 1112, configured to: if the voice information includes a preset keyword, send a second alarm message to the server.

Figure 18:
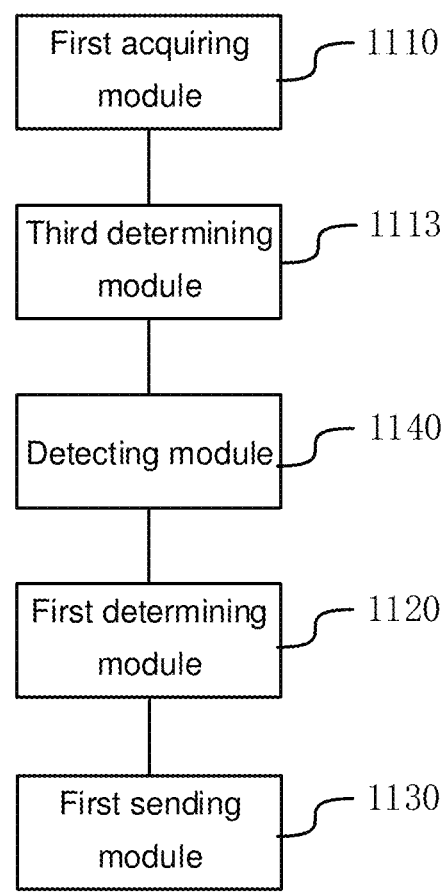
FIG. 18 is a schematic structural diagram of a device for sending an alarm message according to an embodiment of the present disclosure.

Optionally, as shown in FIG. 18, the device further includes:

a third determining module 1113, configured to: if a preset detection trigger condition is fulfilled, perform the step of detecting the face image area and the head and shoulder image area in the detection image based on the preset face and head and shoulder detection algorithm model, wherein the preset detection trigger condition at least includes:

that person's activity information is detected in the detection image; or that an operation notification message sent by a target apparatus is received; or that an object detection notification sent by a sensing apparatus is received.

Optionally, the first determining module 1120 is further configured to:

determine a similarity between a currently detected face image area and/or head and shoulder image area and a face image area and/or head and shoulder image area in each frame of the detection image acquired within a preset period; and the first sending module 1130 is further configured to:

if none of the obtained similarities satisfies a preset similarity condition, perform the step of sending the first alarm message to the server.

In the embodiment of the present disclosure, after the terminal acquires the detection image captured by the image capturing apparatus, the target detection area can be determined in the detection image; the person's call status information corresponding to the image in the target detection area is detected according to the preset on-the-phone determination algorithm model; and the first alarm message is sent to the server if the person's call status information shows that the person is on the phone. In this way, whether a user is on the phone can be recognized in time; and the alarm message can be sent in time when it is detected that the user is on the phone to inform the security guard in time that there may be a swindled user, and to take measures to prevent the user from property loss.

It should be noted that, when sending the alarm message, the device for sending the alarm message provided by the above embodiments is only exemplified by dividing the above-mentioned functional modules. While in practice, the above functions may be assigned to different modules to complete according to the needs. That is, the internal structure of the device may be divided into different functional modules, so as to attain all or part of the functions described above. In addition, the terminal for sending the alarm message and the method for sending the alarm message provided by the above embodiments belong to the same concept. The specific implementation process of the device may refer to the embodiments of the method, and will not be repeated herein again.

Figure 19:
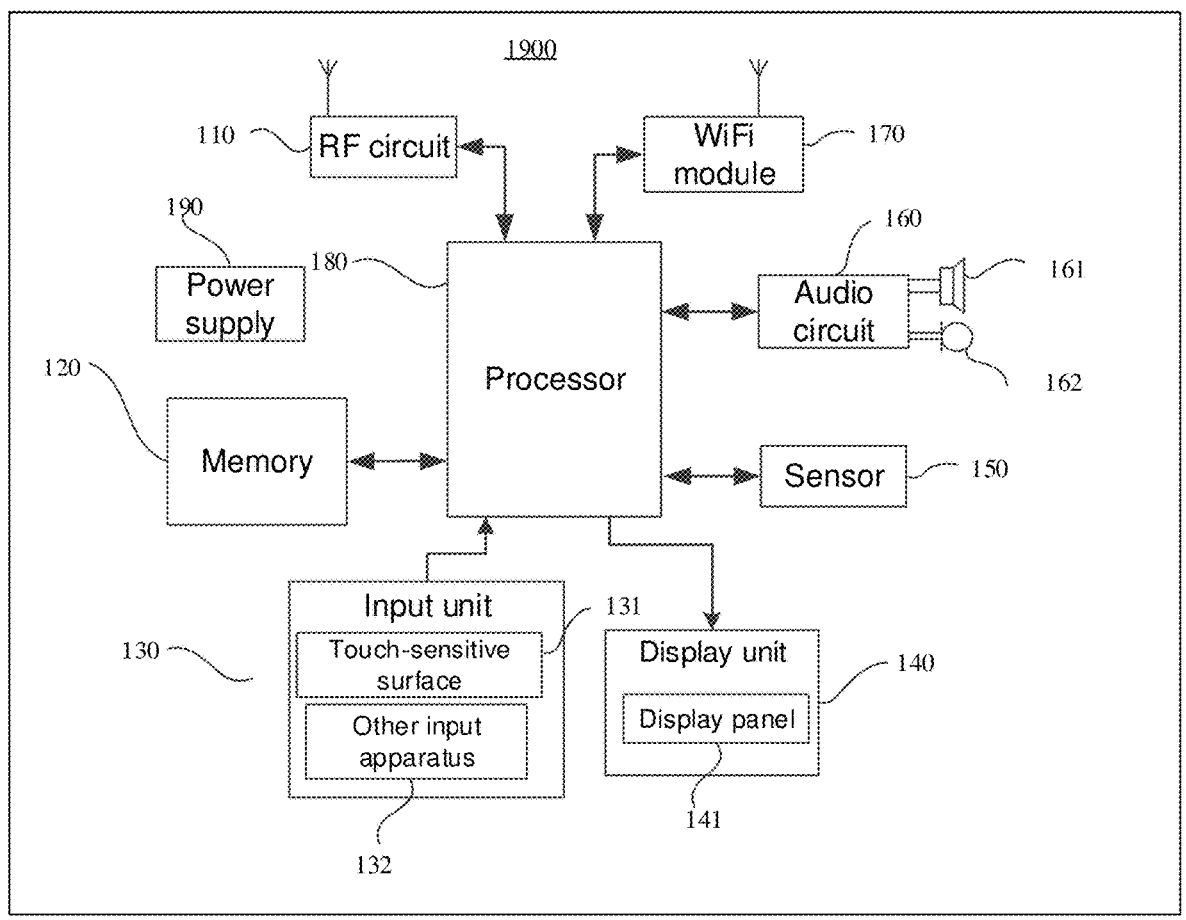
FIG. 19 is a schematic structural diagram of a terminal according to an embodiment of the present disclosure.

FIG. 19 shows a schematic structural diagram of a terminal involved in the embodiments of the present disclosure. The terminal may be configured to implement the method for sending the alarm message provided in the foregoing embodiment.

Specifically, the terminal 1900 may include an RF (Radio Frequency) circuit 110, a memory 120 including one or more computer-readable storage media, an input unit 130, a display unit 140, a sensor 150, an audio circuit 160, a WiFi (wireless fidelity) module 170, a processor 180 including one or more processor cores, a power supply 190, and other components. It will be understood by those skilled in the art that the terminal structure shown in FIG. 19 does not constitute a limitation to the terminal, which may include more or less components than those illustrated in FIG. 14, or a combination of some components, or the components arranged in a different manner.

The RF circuit 110 can be configured to receive and send information in a process of receiving and sending information or a call process. Specifically, after receiving the downstream message of a base station, the RF circuit 110 sends the downstream message to one or more processors 180 to process; in addition, it sends the related upstream data to the base station. Usually, the RF circuit 110 includes but not limited to, an antenna, at least one amplifier, a tuner, one or more oscillators, a subscriber identity module (SIM) card, a transceiver, a coupler, an LNA (Low Noise Amplifier), a duplexer, and the like. In addition, the RF circuit 110 can communicate with other apparatuses through wireless communication and a network. The wireless communication may use any communication standard or protocol, including but not limited to GSM (Global System of Mobile communication), GPRS (General Packet Radio Service), CDMA (Code Division Multiple Access), WCDMA (Wideband Code Division Multiple Access), LTE (Long Term Evolution), an e-mail, SMS (Short Messaging Service), and the like.

The memory 120 can be configured to store software programs and modules.

The processor 180 executes various functional applications and data processing by running software programs and modules stored in the memory 120. The memory 120 may mainly include a program storage section and a data storage section. Wherein, the program storage section may store an operating system, an application required by at least one function (such as a sound playback function and an image playback function), and the like. The data storage section may store data (such as audio data, phone directory, etc.) created in accordance with the use of the terminal 1900. In addition, the memory 120 may include a high-speed random access memory and may further include a non-volatile memory, such as at least one magnetic disk storage device, a flash memory device, or other volatile solid-state memory devices. Correspondingly, the memory 120 may further include a memory controller to provide the processor 180 and the input unit 130 with the access to the memory 120.

The input unit 130 can be configured to receive input numeric or character information and to generate a keyboard signal input, a mouse signal input, a joystick signal input, an optical signal input, or a trackball signal input related to the user settings and function controls. Specifically, the input unit 130 can include a touch-sensitive surface 131 as well as other input apparatus 132. The touch-sensitive surface 131, also referred to as a touch display or touchpad, can collect touch operations of a user (such as the user using a finger, a touch pen, or any suitable object or accessory to operate on or near the touch-sensitive surface 131), and can drive the corresponding connecting device according to a preset program. Optionally, the touch-sensitive surface 131 can include two portions, namely a touch detection device and a touch controller. Wherein, the touch detection device detects a touch orientation of the user, detects a signal brought by the touch operation, and transmits the signal to the touch controller. The touch controller receives the touch information from the touch detection device, converts the touch information into a contact coordinate, and then sends the contact coordinate to the processor 180. Further, the touch controller can receive a command sent from the processor 180 and execute the command. In addition, the touch-sensitive surface 131 can be of resistive type, capacitive type, infrared type, and surface acoustic wave type. In addition to the touch-sensitive surface 131, the input unit 130 can further include other input apparatus 132. Specifically, the input apparatus 132 may include but not limited to, one or more of a physical keyboard, a function key (such as a volume control button, and a switch button), a trackball, a mouse, a joystick, and the like.

The display unit 140 can be configured to display the information input by the user or the information provided to the user, and various graphical user interfaces of the terminal 1900. These graphical user interfaces may be composed of a graph, a text, an icon, a video, and any combination thereof. The display unit 140 may include a display panel 141. Optionally, the display panel 141 may be configured in the form of an LCD (Liquid Crystal Display), an OLED (Organic Light-Emitting Diode), or the like. Further, the touch-sensitive surface 131 may cover the display panel 141. When the touch-sensitive surface 131 detects a touch operation thereon or nearby, the touch operation is transmitted to the processor 180 to determine the type of a touch event. Then, the processor 180 provides a corresponding visual output on the display panel 141 according to the type of the touch event. Although in FIG. 19, the touch-sensitive surface 131 and the display panel 141 are two separate components to implement input and output functions, in some embodiments, the touch-sensitive surface 131 and the display panel 141 can be integrated to realize the input/output function.

The terminal 1900 can further include at least one type of sensor 150, such as a light sensor, a motion sensor, and other sensors. Specifically, the light sensor may include an ambient light sensor and a proximity sensor. Wherein, the ambient light sensor can adjust the brightness of the display panel 141 according to the brightness of the ambient light. The proximity sensor can turn off the display panel 141 and/or the back light when the terminal 1900 moves to the ear. As a kind of motion sensor, the gravity acceleration sensor can detect the acceleration in all directions (usually on three axes), can detect gravity and the direction thereof when it is stationary, and can be applied to an application to identify a posture of a mobile phone (such as a horizontal and vertical screen switching, a related game, and magnetometer posture calibration), a vibration recognition related function (such as a pedometer and tapping), and the like. Other sensors such as a gyroscope, a barometer, a hygrometer, a thermometer, and an infrared sensor that may be deployed in the terminal 1900 are not repeated herein.

The audio circuit 160, a speaker 161, and a microphone 162 can provide an audio interface between the user and the terminal 1900. On the one hand, the audio circuit 160 can transmit a received electrical signal, which is converted from the audio data, to the speaker 161; and the speaker 161 converts the electrical signal to a sound signal to output. On the other hand, the microphone 162 converts the collected sound signal into an electrical signal; after being received by the audio circuit 160, the electrical signal is converted into audio data. After being output to the processor 180 to process, the audio data is sent to, for example, another terminal through the RF circuit 110, or is output to the memory 120 for further processing. The audio circuit 160 may further include an earplug jack for providing the communication between an external earphone and the terminal 1900.

WiFi is a short-range wireless transmission technology. With the WiFi module 170, the terminal 1900 may assist users in sending and receiving e-mails, browsing web pages, and visiting streaming media, which provides wireless broadband internet visit for the users. Although FIG. 19 shows the WiFi module 170, it can be understood that the WiFi module 170 is not an essential composition of the terminal 1900, and can be completely omitted as needed within the scope where the essence of the present disclosure does not change.

The processor 180 is a control center of the terminal 1900, and is connected to every part of the mobile phone by using various interfaces and lines. By running or executing software programs and/or modules stored in the memory 120, and invoking data stored in the memory 120, the processor 180 executes various functions of the terminal 1900 and processes data so as to comprehensively monitor the mobile phone. Optionally, the processor 180 may include one or more processor cores. Preferably, the processor 180 may integrate an application processor with a modem. The application processor mainly processes an operating system, a user interface, an application, and the like. The modem mainly processes wireless communications. It can be understood that the above modem may not be integrated into the processor 180.

The terminal 1900 further includes a power supply 190 (such as a battery) for supplying power to the all components. Preferably, the power supply may be in logic connection to the processor 180 through a power supply management system to manage functions such as charging, discharging, and power consumption management. The power supply 190 may further include any of one or more DC or AC power sources, a recharging system, a power failure detection circuit, a power converter or inverter, a power status indicator, and the like.

Although not shown, the terminal 1900 may further include a camera, a Bluetooth module, and the like, and details are not repeated herein. Specifically, in the embodiment, the display unit of the terminal 1900 is a touch screen display. The terminal 1900 further includes a memory, and one or more programs. Wherein, the one or more programs are stored in the memory, are configured to be executed by the one or more processors, and include instructions for executing the above-described method of sending the alarm message in the terminal.

In the embodiment of the present disclosure, the one or more programs include instructions for performing the following steps: after the detection image captured by the image capturing apparatus is acquired, the target detection area can be determined in the detection image; the person's call status information corresponding to the image in the target detection area is detected according to the preset on-the-phone determination algorithm model; and the first alarm message is sent to the server if the person's call status information shows that the person is on the phone. In this way, whether a user is on the phone can be recognized in time; and the alarm message can be sent in time when it is detected that the user is on the phone. Thus, the security guard can be informed in time that there may be a swindled user, and to take measures to prevent the user from property loss.

Optionally, the one or more programs include instructions for performing the following steps:
detecting a face image area and a head and shoulder image area in the detection image based on a preset face and head and shoulder detection algorithm model; and
determining the target detection area in the detection image according to detection results of both the face image area and the head and shoulder image area.

Optionally, the one or more programs include instructions for performing the following steps:
if the face image area and the head and shoulder image area are detected, determining the target detection area in the detection image according to a pre-stored positional relationship among the face image area, the head and shoulder image area, and a detection area; or
if the face image area is detected but the head and shoulder image area is not detected, enlarging the detected face image area, and using the enlarged face image area as the target detection area; or
if the head and shoulder image area is detected but the face image area is not detected, reducing the detected head and shoulder image area, and using the reduced head and shoulder image area as the target detection area.

Optionally, the one or more programs include instructions for performing the following steps:
acquiring a plurality of pre-stored training samples comprising an image sample, and acquiring a face image area and/or a head and shoulder image area in the image sample; and
training a preset first initial algorithm model based on the plurality of training samples to obtain the face and head and shoulder detection algorithm model.

Optionally, the one or more programs include instructions for performing the following steps:
determining a tentative face image area and a tentative head and shoulder image area in the detection image based on the preset face and head and shoulder detection algorithm model, determining a confidence level corresponding to the tentative face image area as well as a confidence level corresponding to the tentative head and shoulder image area;
determining a weight value corresponding to the tentative face image area and a weight value corresponding to the tentative head and shoulder image area according to a pre-stored correspondence relationship between position information and weight;
if the confidence level corresponding to the tentative face image area is greater than a preset first confidence level threshold, and the weight value corresponding to the tentative face image area is greater than a preset first weight value threshold, determining the tentative face image area as the face image area; and
if the confidence level of the tentative head and shoulder image area is greater than a preset second confidence level threshold, and the weight value corresponding to the tentative head and shoulder image area is greater than a preset second weight value threshold, determining the tentative head and shoulder image area as the head and shoulder image area.

Optionally, the one or more programs include instructions for performing the following step: determining a similarity between a currently detected face image area and/or head and shoulder image area and a face image area and/or head and shoulder image area in a previous frame of detection image closest to the current time; and
the one or more programs further include instructions for performing the following step: performing the step of sending the first alarm message to the server if the similarity does not satisfy a preset similarity condition.

Optionally, the one or more programs include instructions for performing the following step:
if a preset detection trigger condition is fulfilled, performing the step of detecting the face image area and the head and shoulder image area in the detection image based on the preset face and head and shoulder detection algorithm model, wherein the preset detection trigger condition at least comprises:

determining that person's activity information is detected in the detection image;

or determining that an operation notification message sent by a target apparatus is received; or determining that an object detection notification sent by a sensing apparatus is received.

Optionally, the one or more programs include instructions for performing the following step: determining a similarity between a currently detected face image area and/or head and shoulder image area and a face image area and/or head and shoulder image area in each frame of detection image acquired within a preset period; and the one or more programs further include instructions for performing the following step: performing the step of sending the first alarm message to the server if none of the obtained similarities satisfies a preset similarity condition.

Optionally, the one or more programs include instructions for performing the following steps:

acquiring a plurality of pre-stored training samples comprising an image sample, and a person's call status information corresponding to the image sample; and training a preset second initial algorithm model based on the plurality of training samples to obtain the on-the-phone determination algorithm model.

Optionally, the one or more programs include instructions for performing the following steps:

acquiring voice information detected by a voice input apparatus; and if the voice information includes a preset keyword, sending a second alarm message to the server.

It should be understood by those skilled in the art that, all or part of the steps of the above embodiments may be implemented through hardware, or through programs that give instructions to the related hardware. The programs may be stored in a computer-readable storage medium which may be a read-only memory, a magnetic disk, or an optical disk.

The foregoing descriptions are only preferred embodiments of the present disclosure, and do not intend to limit the present disclosure. Any variation, equivalent substitution and modification that fall within the spirit and principle of the present disclosure should be embraced by the protective scope of the present disclosure.

What is claimed is:

1. A method for sending an alarm message, comprising:

acquiring a detection image captured by an image capturing apparatus;

determining a target detection area in the detection image; and detecting a person's call status information corresponding to an image in the target detection area according to a preset on-the-phone determination algorithm model, and sending a first alarm message to a server if the person's call status information shows that the person is on the phone, wherein determining the target detection area in the detection image comprises: detecting a face image area and a head and shoulder image area in the detection image based on a preset face and head and shoulder detection algorithm model; and determining the target detection area in the detection image according to detection results of both the face image area and the head and shoulder image area, and wherein detecting the face image area and the head and shoulder image area in the detection image based on the preset face and head and shoulder detection algorithm model comprises:

determining a tentative face image area and a tentative head and shoulder image area in the detection image based on the preset face and head and shoulder detection algorithm model, determining a confidence level corresponding to the tentative face image area as well as a confidence level corresponding to the tentative head and shoulder image area;

determining a weight value corresponding to the tentative face image area and a weight value corresponding to the tentative head and shoulder image area according to a pre-stored correspondence relationship between position information and weight;

in response to the confidence level corresponding to the tentative face image area being greater than a preset first confidence level threshold, and the weight value corresponding to the tentative face image area being greater than a preset first weight value threshold, determining the tentative face image area as the face image area; and in response to the confidence level of the tentative head and shoulder image area being greater than a preset second confidence level threshold, and the weight value corresponding to the tentative head and shoulder image area being greater than a preset second weight value threshold, determining the tentative head and shoulder image area as the head and shoulder image area.

2. The method according to claim 1, wherein determining the target detection area in the detection image according to the detection results of both the face image area and the head and shoulder image area further comprises:

in a case that detection results of both the face image area and the head and shoulder image area indicate that the face image area and the head and shoulder image area are detected, determining the target detection area in the detection image according to a pre-stored positional relationship among the face image area, the head and shoulder image area, and a detection area; or in a case that detection results of both the face image area and the head and shoulder image area indicate that the face image area is detected but no head and shoulder image area is detected, enlarging the detected face image area, and using the enlarged face image area as the target detection area; or in a case that detection results of both the face image area and the head and shoulder image area indicate that the head and shoulder image area is detected but no face image area is detected, reducing the detected head and shoulder image area, and using the reduced head and shoulder image area as the target detection area.

3. The method according to claim 1, further comprising:

acquiring a plurality of pre-stored training samples comprising an image sample, and acquiring a face image area and/or a head and shoulder image area in the image sample; and training a preset first initial algorithm model based on the plurality of training samples to obtain the face and head and shoulder detection algorithm model.

4. The method according to claim 1, further comprising:

determining a similarity between a currently detected face image area and/or head and shoulder image area and a face image area and/or head and shoulder image area in a previous frame of detection image closest to the current time, wherein prior to sending the first alarm message to the server, the method further comprises:
in response to the similarity not satisfying a preset similarity condition, performing the step of sending the first alarm message to the server.

5. The method according to claim 1, wherein prior to detecting the face image area and the head and shoulder image area in the detection image based on the preset face and head and shoulder detection algorithm model, the method further comprises:
in response to a preset detection trigger condition being fulfilled, performing the step of detecting the face image area and the head and shoulder image area in the detection image based on the preset face and head and shoulder detection algorithm model, wherein the preset detection trigger condition at least comprises:
determining that a person's activity information is detected in the detection image; or
determining that an operation notification message sent by a target apparatus is received; or
determining that an object detection notification sent by a sensing apparatus is received.

6. The method according to claim 1, further comprising:
determining a similarity between a currently detected face image area and/or head and shoulder image area and a face image area and/or head and shoulder image area in each frame of detection image acquired within a preset period, wherein
prior to sending the first alarm message to the server, the method further comprises:
in response to that none of the obtained similarities satisfies a preset similarity condition, performing the step of sending the first alarm message to the server.

7. The method according to claim 1, further comprising:
acquiring a plurality of pre-stored training samples comprising an image sample, and a person's call status information corresponding to the image sample; and
training a preset second initial algorithm model based on the plurality of training samples to obtain the on-the-phone determination algorithm model.

8. The method according to claim 1, further comprising:
acquiring voice information detected by a voice input apparatus; and
in response to the voice information comprising a preset keyword, sending a second alarm message to the server.

9. A non-transitory computer-readable storage medium, having stored therein a computer program, that, when executed by a processor, implements the steps of claim 1-8 the computer program is executed by one or more processors to perform:
acquiring a detection image captured by an image capturing apparatus;
determining a target detection area in the detection image; and
detecting a person's call status information corresponding to an image in the target detection area according to a preset on-the-phone determination algorithm model, and sending a first alarm message to a server if the person's call status information shows that the person is on the phone,
wherein determining the target detection area in the detection image comprises: detecting a face image area and a head and shoulder image area in the detection image based on a preset face and head and shoulder detection algorithm model; and determining the target detection area in the detection image according to detection results of both the face image area and the head and shoulder image area, and
wherein detecting the face image area and the head and shoulder image area in the detection image based on the preset face and head and shoulder detection algorithm model comprises:
determining a tentative face image area and a tentative head and shoulder image area in the detection image based on the preset face and head and shoulder detection algorithm model, determining a confidence level corresponding to the tentative face image area as well as a confidence level corresponding to the tentative head and shoulder image area;
determining a weight value corresponding to the tentative face image area and a weight value corresponding to the tentative head and shoulder image area according to a pre-stored correspondence relationship between position information and weight;
in response to the confidence level corresponding to the tentative face image area being greater than a preset first confidence level threshold, and the weight value corresponding to the tentative face image area being greater than a preset first weight value threshold, determining the tentative face image area as the face image area; and
in response to the confidence level of the tentative head and shoulder image area being greater than a preset second confidence level threshold, and the weight value corresponding to the tentative head and shoulder image area being greater than a preset second weight value threshold, determining the tentative head and shoulder image area as the head and shoulder image area.

10. A terminal, which comprises:
one or more processors; and
one or more memories, wherein
the one or more memories are configured to store executable program codes; the executable program codes stored in the one or more memories are executed by the one or more processors to perform:
acquiring a detection image captured by an image capturing apparatus;
determining a target detection area in the detection image; and
detecting a person's call status information corresponding to an image in the target detection area according to a preset on-the-phone determination algorithm model, and sending a first alarm message to a server if the person's call status information shows that the person is on the phone,
wherein the one or more programs comprise instructions for performing the following steps:
detecting a face image area and a head and shoulder image area in the detection image based on a preset face and head and shoulder detection algorithm model; and
determining the target detection area in the detection image according to detection results of both the face image area and the head and shoulder image area, and
wherein detecting the face image area and the head and shoulder image area in the detection image based on the preset face and head and shoulder detection algorithm model comprises:
determining a tentative face image area and a tentative head and shoulder image area in the detection image based on the preset face and head and shoulder detection algorithm model, determining a confidence level corresponding to the tentative face image area as well as a confidence level corresponding to the tentative head and shoulder image area;

determining a weight value corresponding to the tentative face image area and a weight value corresponding to the tentative head and shoulder image area according to a pre-stored correspondence relationship between position information and weight;

in response to the confidence level corresponding to the tentative face image area being greater than a preset first confidence level threshold, and the weight value corresponding to the tentative face image area being greater than a preset first weight value threshold, determining the tentative face image area as the face image area; and in response to the confidence level of the tentative head and shoulder image area being greater than a preset second confidence level threshold, and the weight value corresponding to the tentative head and shoulder image area being greater than a preset second weight value threshold, determining the tentative head and shoulder image area as the head and shoulder image area.

11. The terminal according to claim 10, wherein the one or more programs comprise instructions for performing the following steps:

in a case that detection results of both the face image area and the head and shoulder image area indicate that the face image area and the head and shoulder image area are detected, determining the target detection area in the detection image according to a pre-stored positional relationship among the face image area, the head and shoulder image area, and a detection area; or in a case that detection results of both the face image area and the head and shoulder image area indicate that the face image area is detected but no head and shoulder image area is detected, enlarging the detected face image area, and using the enlarged face image area as the target detection area; or in a case that detection results of both the face image area and the head and shoulder image area indicate that the head and shoulder image area is detected but no face image area is detected, reducing the detected head and shoulder image area, and using the reduced head and shoulder image area as the target detection area.

12. The terminal according to claim 10, wherein the one or more programs comprise instructions for performing the following steps:

acquiring a plurality of pre-stored training samples comprising an image sample, and acquiring a face image area and/or a head and shoulder image area in the image sample; and training a preset first initial algorithm model based on the plurality of training samples to obtain the face and head and shoulder detection algorithm model.

13. The terminal according to claim 10, wherein the one or more programs comprise instructions for performing the following step:

determining a similarity between a currently detected face image area and/or head and shoulder image area and a face image area and/or head and shoulder image area in a previous frame of detection image closest to the current time; and the one or more programs further comprise instructions for performing the following step: performing the step of sending the first alarm message to the server in response to the similarity not satisfying a preset similarity condition.

14. The terminal according to claim 10, wherein the one or more programs comprise instructions for performing the following step:

in response to a preset detection trigger condition being fulfilled, performing the step of detecting the face image area and the head and shoulder image area in the detection image based on the preset face and head and shoulder detection algorithm model, wherein the preset detection trigger condition at least comprises:

determining that a person is detected in the detection image; or determining that an operation notification message sent by a target apparatus is received; or determining that an object detection notification sent by a sensing apparatus is received.

15. The terminal according to claim 10, wherein the one or more programs comprise instructions for performing the following step:

determining a similarity between a currently detected face image area and/or head and shoulder image area and a face image area and/or head and shoulder image area in each frame of detection image acquired within a preset period; and the one or more programs further comprise instructions for performing the following step: performing the step of sending the first alarm message to the server in response to that none of the obtained similarities satisfies a preset similarity condition.

16. The terminal according to claim 10, wherein the one or more programs comprise instructions for performing the following steps:

acquiring a plurality of pre-stored training samples comprising an image sample, and a person's call status information corresponding to the image sample; and training a preset second initial algorithm model based on the plurality of training samples to obtain the on-the-phone determination algorithm model.

* * * * *